US010748175B2

(12) United States Patent
Vierra

(10) Patent No.: US 10,748,175 B2
(45) Date of Patent: *Aug. 18, 2020

(54) PRICE MINING PREVENTION AND DYNAMIC ONLINE MARKETING CAMPAIGN ADJUSTMENT DATA PROCESSING SYSTEMS AND METHODS

(71) Applicant: Viesoft, Inc., Walnut Creek, CA (US)

(72) Inventor: Anthony Vierra, Walnut Creek, CA (US)

(73) Assignee: Viesoft, Inc., Walnut Creek, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/542,562

(22) Filed: Aug. 16, 2019

(65) Prior Publication Data
US 2019/0370853 A1    Dec. 5, 2019

Related U.S. Application Data

(63) Continuation-in-part of application No. 15/379,137, filed on Dec. 14, 2016, now Pat. No. 10,389,752, which is a continuation-in-part of application No. 14/597,029, filed on Jan. 14, 2015, now Pat. No. 9,552,487, application No. 16/542,562, which is a
(Continued)

(51) Int. Cl.
*G06F 21/00* (2013.01)
*G06Q 30/02* (2012.01)

(52) U.S. Cl.
CPC ..... *G06Q 30/0244* (2013.01); *G06Q 30/0275* (2013.01)

(58) Field of Classification Search
None
See application file for complete search history.

(56) References Cited

U.S. PATENT DOCUMENTS 5,873,069 A    2/1999  Reuhl et al.
6,460,022 B1  10/2002  Plotkin
(Continued)

FOREIGN PATENT DOCUMENTS

EP    0973112    1/2000

OTHER PUBLICATIONS

Apgar, S., & Writer, S. (Nov. 30, 1991). Metro retailers kick off holiday shopping season with all-out bargain blitz. Star Tribune Retrieved from http://search.proquest.com/docview/418334202?accountid=14753.
(Continued)

*Primary Examiner* — Maung T Lwin
(74) *Attorney, Agent, or Firm* — Brient IP Law, LLC

(57) ABSTRACT

Price mining and dynamic online marketing campaign adjustment data processing systems and methods are disclosed. A system and method for dynamically adjusting an online marketing campaign, in various embodiments, is configured to increase and/or decrease one or more keyword bids that make up part of an online marketing campaign for a particular product from a particular retailer based on whether: (1) the particular product is or is not competitively priced relative to one or more competing retailers; and/or (2) an advertisement for the particular product from the particular retailer on a search engine results page or in an online marketplace is in a relatively desirable position.

20 Claims, 7 Drawing Sheets

Related U.S. Application Data continuation-in-part of application No. 15/178,226, filed on Jun. 9, 2016, now abandoned.

(56) References Cited

U.S. PATENT DOCUMENTS

| | | | |
|---|---|---|---|
| 6,749,116 B2 | 6/2004 | Massaro | |
| 6,938,170 B1 | 8/2005 | Kraft et al. | |
| 7,421,645 B2 | 9/2008 | Reynar | |
| 7,685,271 B1 | 3/2010 | Schneider et al. | |
| 7,752,072 B2* | 7/2010 | Barry | G06Q 30/02 705/14.49 |
| 7,752,190 B2* | 7/2010 | Skinner | G06Q 30/02 707/706 |
| 7,778,919 B2 | 8/2010 | Waelbroeck et al. | |
| 7,912,755 B2 | 3/2011 | Perry et al. | |
| 7,958,005 B2* | 6/2011 | Dangaltchev | G06Q 30/02 705/14.43 |
| 8,036,937 B2* | 10/2011 | Tang | G06Q 30/02 705/14.46 |
| 8,050,976 B2 | 11/2011 | Staib et al. | |
| 8,091,031 B2 | 1/2012 | Evans | |
| 8,239,282 B2 | 8/2012 | Tuflija et al. | |
| 8,249,885 B2 | 8/2012 | Berkowitz et al. | |
| 8,346,536 B2 | 1/2013 | Jiang et al. | |
| 8,438,072 B2 | 5/2013 | Fusz et al. | |
| 8,522,270 B2 | 8/2013 | Chatter et al. | |
| 8,548,872 B1 | 10/2013 | Gupta et al. | |
| 8,577,734 B2 | 11/2013 | Treyz et al. | |
| 8,583,483 B2 | 11/2013 | Patwa et al. | |
| 8,589,694 B2 | 11/2013 | Clark et al. | |
| 8,719,082 B1* | 5/2014 | Snyder | G06Q 30/0275 705/14.1 |
| 9,037,504 B2 | 5/2015 | Nair | |
| 9,202,229 B2 | 12/2015 | Junger | |
| 9,311,662 B2 | 4/2016 | Skinner | |
| 9,413,786 B1 | 8/2016 | Boss et al. | |
| 2001/0047308 A1 | 11/2001 | Kaminsky et al. | |
| 2002/0072984 A1 | 6/2002 | Rothman et al. | |
| 2003/0110400 A1 | 6/2003 | Cartmell et al. | |
| 2007/0162379 A1* | 7/2007 | Skinner | G06Q 30/02 705/37 |
| 2007/0239560 A1 | 10/2007 | McGuire et al. | |
| 2008/0201214 A1 | 8/2008 | Aaron et al. | |
| 2009/0099902 A1* | 4/2009 | Chatter | G06Q 30/00 705/14.43 |
| 2009/0112609 A1* | 4/2009 | Dangaltchev | G06Q 30/02 705/14.1 |
| 2009/0254455 A1 | 10/2009 | Rothey et al. | |
| 2010/0094673 A1* | 4/2010 | Lobo | G06Q 30/02 705/14.69 |
| 2010/0169194 A1 | 7/2010 | Richey et al. | |
| 2010/0251366 A1 | 9/2010 | Baldry | |
| 2010/0262688 A1 | 10/2010 | Hussain et al. | |
| 2011/0029781 A1 | 2/2011 | Clark et al. | |
| 2011/0270969 A1 | 11/2011 | Noh et al. | |
| 2011/0288928 A1* | 11/2011 | Patwa | G06Q 30/02 705/14.42 |
| 2012/0016906 A1* | 1/2012 | Tang | G06Q 30/0246 707/780 |
| 2012/0046998 A1 | 2/2012 | Staib et al. | |
| 2012/0173326 A1* | 7/2012 | Tao | G06Q 30/0244 705/14.43 |
| 2012/0221485 A1 | 8/2012 | Leidner et al. | |
| 2012/0226558 A1 | 9/2012 | Robyor | |
| 2012/0303412 A1 | 11/2012 | Etzioni | |
| 2013/0132159 A1 | 5/2013 | Wells | |
| 2013/0160079 A1 | 6/2013 | Hebert | |
| 2014/0047111 A1 | 2/2014 | Petta et al. | |
| 2014/0089042 A1 | 3/2014 | Dufresne et al. | |
| 2014/0108090 A1 | 4/2014 | Hwang et al. | |
| 2014/0129288 A1 | 5/2014 | Eager et al. | |
| 2014/0136339 A1* | 5/2014 | Ringdahl | G06Q 30/0275 705/14.71 |
| 2014/0181634 A1* | 6/2014 | Compain | G06F 17/2247 715/234 |
| 2014/0214617 A1 | 7/2014 | Plouffe et al. | |
| 2014/0244629 A1* | 8/2014 | Huang | G06F 16/9535 707/723 |
| 2014/0279189 A1 | 9/2014 | Kubicki et al. | |
| 2014/0304059 A1 | 10/2014 | Wang et al. | |
| 2015/0019361 A1 | 1/2015 | Denton et al. | |
| 2015/0039417 A1* | 2/2015 | Schweier | G06Q 30/0246 705/14.45 |
| 2015/0220975 A1 | 8/2015 | Rychak | |
| 2017/0345011 A1 | 11/2017 | Salami et al. | |

OTHER PUBLICATIONS

Basso et al., Preventing Massive Automated Access to Web Resources, Computers and Security 28, 2009, pp. 174-188, Retrieved from the Internet: https://www.researchgate.net/profile/Alessandro_Basso/publication/222660321_Preventing_massive_automated_access_to_web_resources/links/02fe5137bd77826ca000000.pdf, entire document.

Final Office Action, dated Aug. 31, 2016, from corresponding U.S. Appl. No. 14/145,474.

Final Office Action, dated Aug. 8, 2019, from corresponding U.S. Appl. No. 15/269,717.

Final Office Action, dated Dec. 21, 2018, from corresponding U.S. Appl. No. 14/586,201.

Final Office Action, dated Feb. 7, 2019, from corresponding U.S. Appl. No. 14/477,108.

Final Office Action, dated Mar. 31, 2015, from corresponding U.S. Appl. No. 14/145,474.

Final Office Action, dated May 1, 2019, from corresponding U.S. Appl. No. 15/178,226.

Final Office Action, dated Nov. 8, 2017, from corresponding U.S. Appl. No. 14/586,201.

International Preliminary Report of Patentability, dated Dec. 15, 2016, from corresponding International Application No. PCT/US2015/033544.

International Preliminary Report on Patentability, dated Jul. 5, 2016, from corresponding International Application No. PCT/US2014/072759.

International Preliminary Report on Patentability, dated Jul. 5, 2016, from corresponding International Application No. PCT/US2014/072771.

International Search Report, dated Apr. 23, 2015, from corresponding International Application No. PCT/US2014/072759.

International Search Report, dated Mar. 18, 2016, from corresponding International Application No. PCT/US2016/013273.

International Search Report, dated Mar. 26, 2015, from corresponding International Application No. PCT/US2014/072771.

International Search Report, dated Oct. 28, 2015, from corresponding International Application No. PCT/US2015/033544.

Notice of Allowance, dated Apr. 4, 2019, from corresponding U.S. Appl. No. 15/379,137.

Notice of Allowance, dated Nov. 30, 2016, from corresponding U.S. Appl. No. 14/597,029.

Office Action, dated Apr. 19, 2016, from corresponding U.S. Appl. No. 14/597,029.

Office Action, dated Feb. 14, 2019, from corresponding U.S. Appl. No. 15/269,717.

Office Action, dated Jan. 15, 2016, from corresponding U.S. Appl. No. 14/145,474.

Office Action, dated Jun. 20, 2018, from corresponding U.S. Appl. No. 14/586,201.

Office Action, dated Jun. 6, 2018, from corresponding U.S. Appl. No. 14/477,108.

Office Action, dated Mar. 2, 2017, from corresponding U.S. Appl. No. 14/586,201.

Office Action, dated May 14, 2014, from corresponding U.S. Appl. No. 14/145,474.

Office Action, dated Nov. 12, 2014, from corresponding U.S. Appl. No. 14/145,474.

(56) References Cited

OTHER PUBLICATIONS

Office Action, dated Oct. 17, 2018, from corresponding U.S. Appl. No. 15/379,137.
Office Action, dated Sep. 21, 2018, from corresponding U.S. Appl. No. 15/178,226.
Office Action, dated Sep. 5, 2019, from corresponding U.S. Appl. No. 14/477,108.
Restriction Requirement, dated Feb. 14, 2014, from corresponding U.S. Appl. No. 14/145,474.
Restriction Requirement, dated Jan. 29, 2016, from corresponding U.S. Appl. No. 14/597,029.
Restriction Requirement, dated Nov. 30, 2017, from corresponding U.S. Appl. No. 14/477,108.
Restriction Requirement, dated Oct. 4, 2018, from corresponding U.S. Appl. No. 15/269,717.
Rosenfeld, Spiders and Crawlers and Bots, Oh My: The Economic Efficiency and Public Policy of Online Contracts that Restrict Data Collection, In: Stanford Technology Law Review 3, 2002, Retrieved from https: //journals.law.stanford.edu/sites/default/files/stanford-technology-law-review/online/rosenfeld-spiders-crawlers-bots.pdf, entire document.
Sharon Linstedt—News, Business Reporter. (Dec. 11, 1994 ). How Supermarkets Vie to Keep You. Buffalo News Retrieved from http://search.proquest.com/docview/381043976?accountid=14753.
Written Opinion of the International Searching Authority, dated Apr. 23, 2015, from corresponding International Application No. PCT/US2014/072759.
Written Opinion of the International Searching Authority, dated Mar. 18, 2016, from corresponding International Application No. PCT/US2016/013273.
Written Opinion of the International Searching Authority, dated Mar. 26, 2015, from corresponding International Application No. PCT/US2014/072771.
Written Opinion of the International Searching Authority, dated Oct. 28, 2015, from corresponding International Application No. PCT/US2015/033544.
Decision on Appeal, dated Jul. 29, 2019, from corresponding U.S. Appl. No. 14/145,474.
Office Action, dated Oct. 4, 2019, from corresponding U.S. Appl. No. 15/178,226.
Office Action, dated Oct. 10, 2019, from corresponding U.S. Appl. No. 16/542,566.
Office Action, dated Oct. 31, 2019, from corresponding U.S. Appl. No. 14/586,201.
Restriction Requirement, dated Nov. 25, 2019, from corresponding U.S. Appl. No. 16/542,637.
Notice of Allowance, dated Feb. 6, 2020, from corresponding U.S. Appl. No. 16/542,566.
Restriction Requirement, dated Jan. 15, 2020, from corresponding U.S. Appl. No. 16/542,630.
Office Action, dated Jan. 24, 2020, from corresponding U.S. Appl. No. 14/145,474.
Office Action, dated Apr. 16, 2020, from corresponding U.S. Appl. No. 16/542,630.
Office Action, dated Jun. 9, 2020, from corresponding U.S. Appl. No. 16/542,637.

* cited by examiner

PRICE MINING PREVENTION AND DYNAMIC ONLINE MARKETING CAMPAIGN ADJUSTMENT DATA PROCESSING SYSTEMS AND METHODS

CROSS-REFERENCE TO RELATED APPLICATIONS

This application is a continuation-in-part of U.S. patent application Ser. No. 15/379,137, filed Dec. 14, 2016, now U.S. Pat. No. 10,389,752, which is a continuation-in-part of U.S. patent application Ser. No. 14/597,029, filed Jan. 14, 2015, now U.S. Pat. No. 9,552,487, both of which are entitled "Price Mining Prevention Systems and Related Methods." This application is also a continuation-in-part of U.S. patent application Ser. No. 15/178,226, filed Jun. 9, 2016, entitled "Systems for Dynamically Adjusting Online Marketing Campaigns and Related Methods." The disclosures of all of the above patent applications and patents are hereby incorporated herein by reference in their entirety.

BACKGROUND

Online retailers and others may desire to price products they offer in a competitive manner to improve sales. Such retailers may further desire to prevent competitors from undercutting their prices. Accordingly, there is a need for improved systems and methods that address these needs.

Online retailers typically desire to maximize the effectiveness of their online marketing campaigns while minimizing the cost of undertaking such campaigns. Online retailers may further desire to increase conversion of those marketing campaigns into sales. Accordingly, there is currently a need for improved systems for increasing sales derived from online marketing campaigns while reducing cost.

SUMMARY

A non-transitory computer-readable medium storing computer-executable instructions for processing unwanted access source data associated with price mining on an online retail website by: (A) detecting, by one or more computer processors, an access to a particular web page containing pricing information; (B) determining, by one or more computer processors, whether a source of the access is an individual employed by one or more competitors of a company that owns the particular web page being accessed; and (C) at least partially in response to determining that the individual is employed by one or more competitors of a company that owns the particular web page being assessed, taking, by one or more computer processors, one or more defensive actions against the source of the access.

A computer-implemented method for processing unwanted access source data associated with price mining on an online retail website, the computer-implemented method comprising the steps of: (A) detecting, by one or more computer processors, an access to a particular web page containing pricing information; (B) determining, by one or more computer processors, whether a source of the access is an individual that is employed by one or more competitors of a company and that owns the particular web page being accessed; (C) determining, by one or more computer processors, a job title of the individual; (D) determining, by one or more computer processors, based on the job title, that the individual should be prohibited from obtaining pricing information from the online retail website; and (E) in response to determining that the individual should be prohibited from obtaining pricing information from the online retail website, taking, by a processor, one or more defensive actions against the source of the access.

A computer-implemented method for processing online marketing campaign data and dynamically adjusting one or more keyword bids for an online marketing campaign for a first product offered for sale by a first advertiser, according to particular embodiments, comprises: the method comprising: (1) receiving, by one or more processors, first pricing data associated with the first product offered for sale by the first advertiser; (2) receiving, by one or more processors, online marketing campaign data for the first product, the online marketing campaign data comprising: (a) a first keyword associated with the online marketing campaign; and (b) a first bid associated with the first keyword; (3) determining, by one or more processors based at least in part on the first keyword, a position of an advertisement for the first product relative to one or more other advertisements for the first product associated with one or more competing advertisers; (4) determining, by one or more processors, second pricing data associated with the one or more other advertisements; and (5) substantially automatically adjusting the first bid, by one or more processors, based at least in part on the first pricing data, the second pricing data, and the position of the advertisement for the first product relative to the one or more other advertisements.

A computer-implemented method of processing online marketing campaign data for a particular product, in various embodiments, comprises: (1) providing a user interface for inputting one or more business rules associated with an online marketing campaign associated with the particular product on a computing device associated with a first retailer; and (2) receiving one or more business rules associated with the online marketing campaign at a marketing campaign server via the user interface over the Internet, the online marketing campaign server comprising one or more processors and a memory that stores online marketing campaign data and pricing data associated with the particular product. In various embodiments: (1) the online marketing campaign data comprises one or more keywords and one or more bids associated with each of the one or more keywords; and (2) the pricing data comprises a price at which the particular product is offered for sale by the first retailer. In still other embodiments, the method further comprises: (1) determining, by one or more processors, a position of a first advertisement for the particular product on a search engine results page derived from an Internet search comprising the one or more keywords; (2) determining, by one or more processors, second pricing data for a second advertisement for the particular product on the search engine results page; and (3) substantially automatically adjusting the one or more bids based at least in part on the position of the first advertisement, the pricing data, the second pricing data, and the one or more business rules.

A computer system for processing marketing campaign data for a first product based at least in part on one or more marketing adjustment preferences, in particular embodiments, comprises an online marketing campaign server comprising one or more processors and a memory that stores the one or more marketing adjustment preferences. In various embodiments, the one or more processors are configured for: (1) providing, on a computing device associated with a first retailer, a user interface for providing the one or more marketing adjustment preferences; (2) receiving, via the user interface, the one or more marketing adjustment preferences, wherein the one or more marketing adjustment preferences comprise a request to take a particular action based at least in part on a position and a price of a first advertisement for the first product offered by the retailer relative to one or more second advertisements for the first product offered by one or more second retailers on a search engine results page; (3) storing the one or more marketing adjustment preferences in memory; (4) receiving, via a third party keyword bidding server, marketing campaign data associated with the first product for an online marketing campaign initiated by the first retailer the marketing campaign data comprising a first keyword and a first bid associated with the keyword; (5) submitting a search engine query comprising the keyword, via the Internet, to a search engine associated with the online marketing campaign; (6) in response to submitting the search engine query, receiving a search engine results page; (7) determining a relative position of the first advertisement for the first product from the first retailer with respect to the one or more second advertisements for the first product from the one or more second retailers on the search engine results page; (8) determining a relative price of the first product from the first retailer versus the one or more second retailers; (9) determining, based at least part on the one or more marketing adjustment preferences, whether to adjust the first bid based at least in part on the relative position of the first advertisement with respect to the one or more second advertisements, and the relative price of the first product from the first retailer versus the one or more second retailers; and (10) in response to determining to adjust the first bid, transmitting a request to the third party keyword bidding server to adjust the first bid based at least in part on the one or more marketing adjustment preferences.

BRIEF DESCRIPTION OF THE DRAWINGS

Various embodiments of a system and method for pricing products are described below.

In the course of this description, reference will be made to the accompanying drawings, which are not necessarily drawn to scale, and wherein.

DETAILED DESCRIPTION

Figure 1:
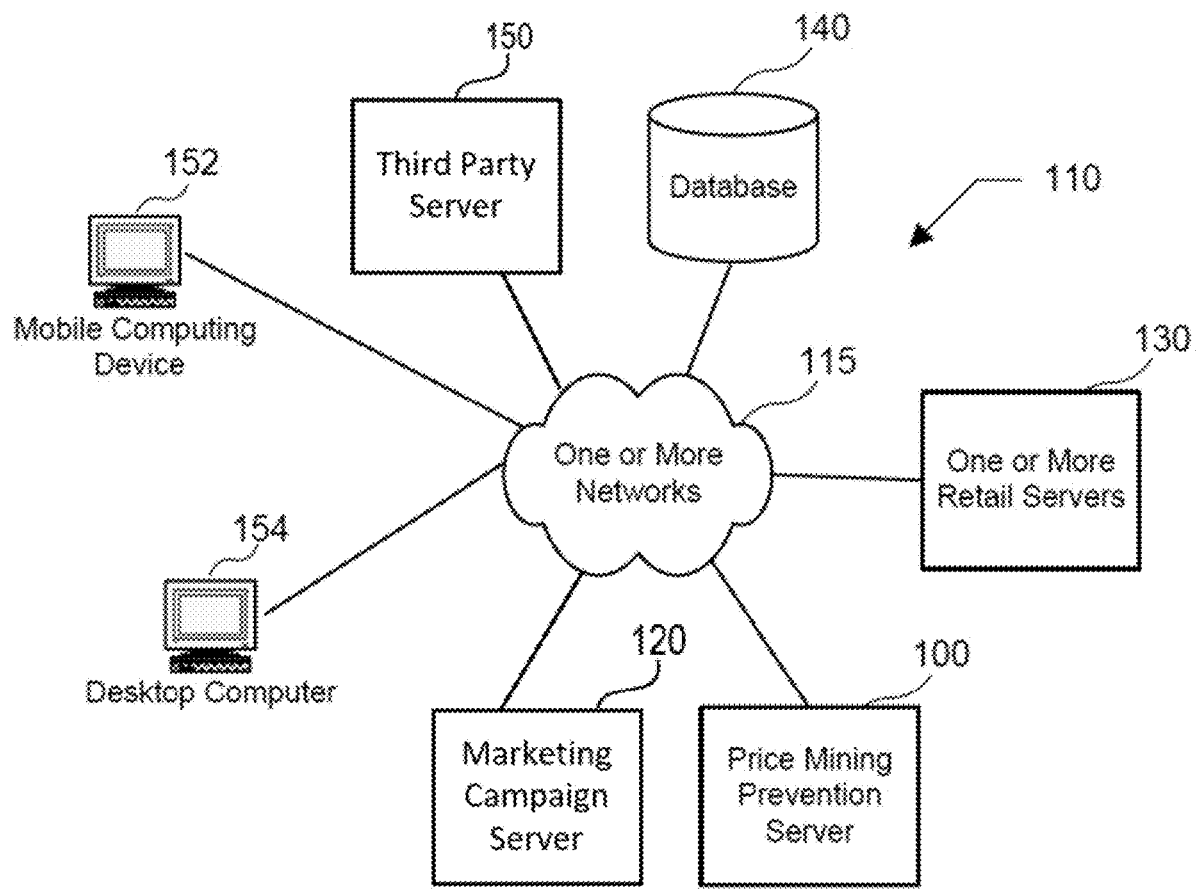
FIG. 1 is a block diagram of a system in accordance with an embodiment of the present system.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

Various companies may attempt to mine data from websites and other sources about their competitors using bots and/or people to access the data. This data may include, for example, product data, pricing data, and other suitable data associated with one or more products offered for sale via a particular web page. In particular embodiments, a price mining prevention system may be configured to detect and analyze website access and enable website administrators to implement one or more defenses to prevent unwanted access. In various embodiments, the system may, for example: (1) detect access to a web page from a particular source; (2) determine whether the particular source may be an unwanted source; and (3) at least partially in response to determining that the particular source is an unwanted source, take a defensive action against the particular source (e.g., by blocking further access from that particular source).

In particular embodiments, the system may be configured to determine that a particular access of a web page is a potentially unwanted access based at least in part on: (1) an IP address from which the web page was accessed (e.g., a particular competitor may own a particular range of one or more IP addresses and the accessing IP address may be within that particular range); (2) a zip code associated with an IP address from which the web page was accessed (e.g., because a particular competitor may have offices or be headquartered at that zip code); (3) a user associated with the IP address from which the web page was accessed (e.g., the user may be an employee of a competitor or associated with a competitor); (4) an access pattern from a particular IP address (e.g., systematic access from a particular IP address); and/or (5) any other suitable factor.

In various embodiments, the system is configured to track access to one or more websites (e.g., one or more related websites associated with a particular company). The system may then identify access patterns (e.g., from a particular IP address) in order to determine whether a particular access is substantially automated. The system may make this determination based at least in part on: (1) frequency of access (e.g., how often the website is accessed); (2) number of particular web pages accessed; and/or (3) any other suitable factor.

In particular embodiments, at least partially in response to determining that a particular access may be substantially automated (e.g., the access may be by a bot rather than a human user), the system may be configured to verify that the access is by a human by requiring completion of one or more Completely Automated Public Turing Tests to tell Computers and Humans Apart (CAPTCHA). In other embodiments, the system may be configured to substantially automatically block access from a source determined to be substantially automated.

In other embodiments, the system may be configured to substantially prevent access to one or more particular web pages by particular human users (e.g., in addition to automated bots). For example, the system may be configured to block access to one or more particular web pages by employees or other persons associated with a particular company who may be attempting to access web pages to ascertain data such as the data described above. In various embodiments, the system may be configured to identify individuals accessing a particular web page as individuals associated with a competitor by, for example: (1) requiring individuals accessing the particular web page to register an account; and (2) using a particular individual's account information to determine if the individual is a known employee of a competitor (e.g., because the individual is listed as an employee on the competitor's web page or other publicly available employee list).

In various embodiments, the system may be configured to determine that a particular individual is an employee of or otherwise associated with a competitor based at least in part on social networking data associated with the particular individual. For example, the system may search one or more social networks for users that have registered with a similar name or email address as a particular individual that has registered for an account with their web page. The system may then be configured to mine any associated social network accounts (e.g., Facebook, Twitter, Foursquare, Instagram, etc.) to determine an employer of the particular individual as well as any other potentially useful information about the individual.

In various embodiments, the system is configured to analyze website access and determine and implement particular defensive measures (e.g., blocking, CAPTCHA requirement, etc.) substantially in real time. In other embodiments, the system is configured to review and analyze access data from a log of access information at a later time from when the access occurred.

In particular embodiments, the system is embodied as a plugin for a particular website that is offered as a service provided by a price mining prevention company. In various embodiments, the system (or the price mining prevention company) may track access by all customers of the service, which may, for example, enable the price mining prevention company to determine unwanted access, which may come from one or more non-competitor sources (e.g., access from third party companies hired by competitors of their companies to monitor pricing data).

In various embodiments, a price mining prevention system may enable websites to at least substantially reduce unwanted web traffic to their websites. In particular embodiments, the system may enable websites to substantially prevent competitors from accessing pricing and other data available on their websites.

In various embodiments, a system for dynamically adjusting an online marketing campaign may be configured for adjusting a retailer's online marketing campaign based on, for example, a price adjustment for a particular product by one or more competitors, a competitiveness of a price point of a particular product offered for sale by the retailer compared to one or more competitors, or any other suitable factor. In various embodiments, the adjustment to the online marketing campaign may include, for example, ceasing the online marketing campaign, initiating a new online marketing campaign, adjusting one or more bids for one or more keywords in a keyword bidding advertising system (e.g., Google AdWords, Bing Ads, etc.), or taking any other suitable action.

In various embodiments, the online marketing campaign may include pay-per-click marketing. The pay-per-click marketing, as part of the online marketing campaign, may include one or more bids for one or more keywords through suitable keyword bidding advertising system. For example, a particular nutritional supplement company may bid on keywords relating health promotion, particular products, particular supplements, etc. as part of an online marketing campaign. The company may, for example, provide different bids for different keywords. In various embodiments, the online marketing campaign may be directed toward ensuring that a particular link (e.g., a link to purchase a particular product or products offered for sale by the company) is part of a search engine results page (e.g., to provide exposure to the particular product or products to users of a search engine that have searched for the particular related keywords on which the company has bid). In particular embodiments, the search engine results page may include any suitable search engine results page of a multi-page list of search results (e.g., page 1, page 2, etc.). In various embodiments, a bid price is the price paid by a particular retailer when a user of an Internet search engine clicks on a link associated with the particular retailer on a search engine results page after the user has search for the keyword for which the particular retailer has placed the bid.

In a particular embodiment, the system for dynamically adjusting an online marketing campaign may be configured for: (1) receiving first pricing data for a particular product offered for sale by a first retailer; (2) receive data associated an online marketing campaign for the particular product initiated by the first retailer; (3) determining a position of a first advertisement for the first product from the first retailer in a search engine results page or online shopping marketplace; (4) determining second pricing data for the particular product offered for sale by one or more competing retailers within the search engine results page or online shopping marketplace; and (5) adjusting the online marketing campaign based at least in part on the position of the first advertisement, the first pricing data, and the second pricing data.

For example, a first retailer may reduce a bid on a particular keyword where the first retailer is listed as the first result on a search engine results page associated with the particular keyword. The first retailer may reduce the bid on the particular keyword, for example, because a competing retailer that is the second or third result on the search engine results page associated with the particular keyword is offering the particular product at a lower price than the first retailer. In such an example, the first retailer may be overbidding on the particular keyword because, although users of a search engine searching for the particular keyword are visiting the first retailer's web site, the users are generally completing a purchase for the particular product through the competing retailer's web site at the lower price.

Example Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions (e.g., a computer-implemented method). These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of a System 110 according to a particular embodiment. As may be understood from this figure, the System 110 may include One or More Networks 115, a Price Mining Prevention Server 100, a Marketing Campaign Server 120, One or More Retail Servers 130, a Database 140, a Third Party Server 150, one or more computing devices, such as a Mobile Computing Device 152 (e.g., a smart phone, a tablet computer, a wearable computing device, a laptop computer, etc.) and a Desktop Computer 154. In particular embodiments, the One or More Networks 115 facilitate communication between any of the Price Mining Prevention Server 100, Marketing Campaign Server 120, the One or More Retail Servers 130, the Third Party Server 150, the Database 140, and the one or more computing devices 152, 154.

The One or More Networks 115 may include any of a variety of types of wired and/or wireless computer networks such as the Internet, a private intranet, a mesh network, a public switch telephone network (PSTN), or any other type of network (e.g., a network that uses Bluetooth or near field communications to facilitate communication between computers). The communication link between the Price Mining Prevention Server 100 and Database 140 may be, for example, implemented via a Local Area Network (LAN) or via the Internet. In another example, the communication link between the Marketing Campaign Server 120 and Database 140 may be, for example, implemented via a Local Area Network (LAN) or via the Internet. In yet another example, any of the one or more remote computing devices 152, 154 may communicate with Database 140, the Marketing Campaign Server 120, and/or the Third Party Server 150 via a Local Area Network (LAN) or via the Internet.

Figure 2:
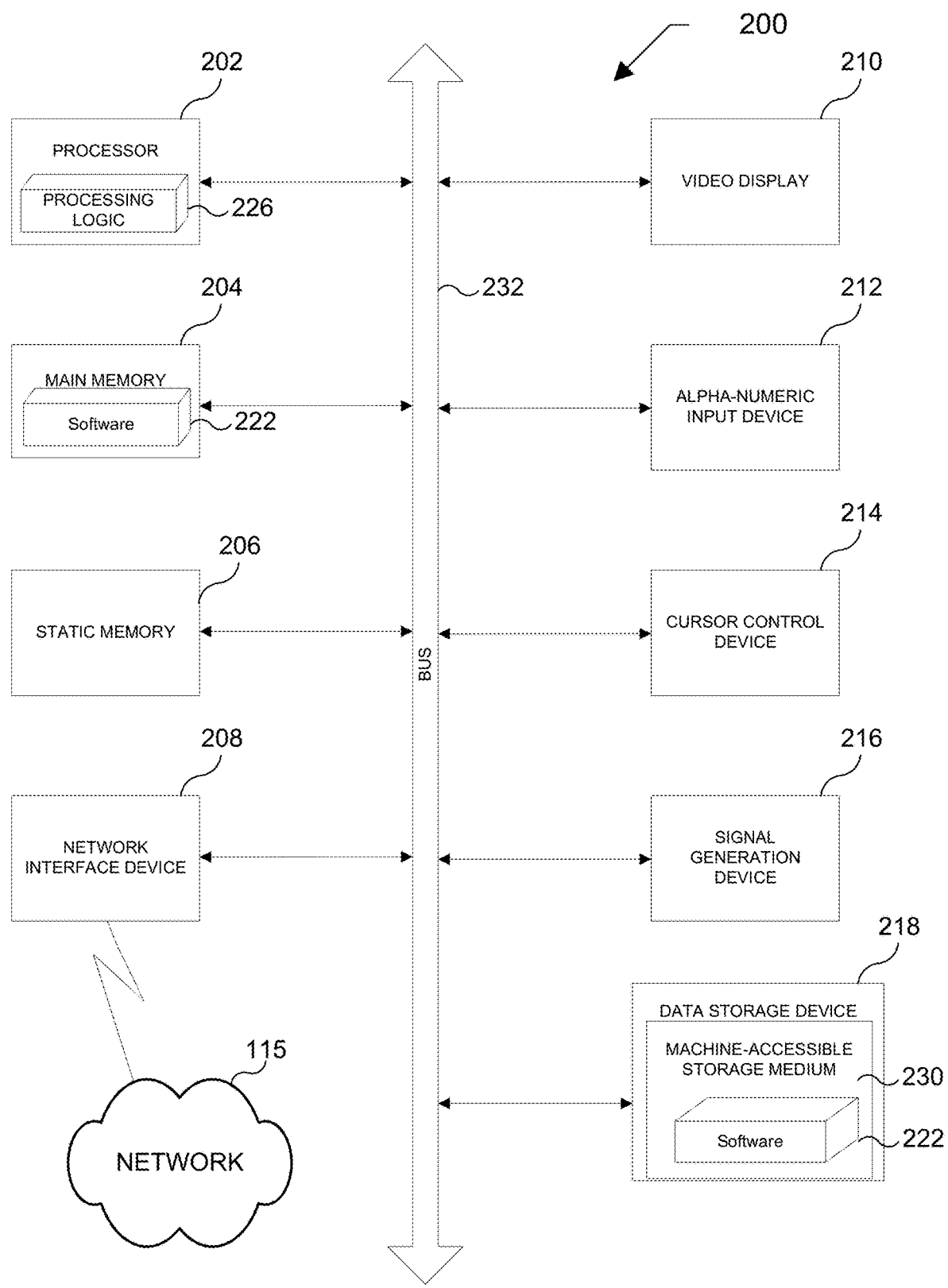
FIG. 2 is a schematic diagram of a computer, such as the system of FIG. 1, that is suitable for use in various embodiments.

FIG. 2 illustrates a diagrammatic representation of a Computer 200 that can be used within the System 110, for example, as a client computer (e.g., one of the remote computing devices 152, 154 shown in FIG. 1), or as a server computer (e.g., Price Mining Prevention Server 100, Marketing Campaign Server 120, Third Party Server 150 shown in FIG. 1). In particular embodiments, the Computer 200 may be suitable for use as a computer within the context of the System 110 that is configured for collecting, tracking, and storing price mining prevention data. In other embodiments, the Computer 200 may be suitable for use as a computer within the context of the System 110 that is configured for collecting, tracking, and storing marketing campaign data. In various embodiments, the Computer 200 may be suitable for performing one or more functions of a Price Mining Prevention Server 100, a Third Party Server 150, or a Marketing Campaign Server 120, or may perform any subset of the functions of any of a Price Mining Prevention Server 100, a Third Party Server 150 and a Marketing Campaign Server 120.

In particular embodiments, the Computer 200 may be connected (e.g., networked) to other computers in a LAN, an intranet, an extranet, and/or the Internet. As noted above, the Computer 200 may operate in the capacity of a server or a client computer in a client-server network environment, or as a peer computer in a peer-to-peer (or distributed) network environment. The Computer 200 may be a desktop personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An example Computer 200 includes a Processor 202, a Main Memory 204 (e.g., read-only memory (ROM), flash memory, dynamic random access memory (DRAM) such as synchronous DRAM (SDRAM) or Rambus DRAM (RDRAM), etc.), a Static Memory 206 (e.g., flash memory, static random access memory (SRAM), etc.), and a Data Storage Device 218, which may communicate with each other via a Bus 232.

The Processor 202 represents one or more general-purpose or specific processing devices such as a microprocessor, a central processing unit, and the like. More particularly, the Processor 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The Processor 202 may also be one or more special-purpose processors such as an application specific integrated circuit (ASIC), a field programmable gate array (FPGA), a digital signal processor (DSP), a network processor, and the like. The Processor 202 may be configured to execute Processing Logic 226 for performing various operations and steps discussed herein.

The Computer 200 may further include a Network Interface Device 208. The Computer 200 may also include a Video Display 210 (e.g., a liquid crystal display (LCD) or a cathode ray tube (CRT)), an Alpha-Numeric Input Device 212 (e.g., a keyboard), a Cursor Control Device 214 (e.g., a mouse), and a Signal Generation Device 216 (e.g., a speaker).

The Data Storage Device 218 may include a Machine-Accessible Storage Medium (e.g., a non-transitory computer-accessible storage medium) 230 (also known as a non-transitory computer-readable storage medium or a non-transitory computer-readable medium) on which is stored one or more sets of instructions (e.g., Software 222) embodying any one or more of the methodologies or functions described herein (e.g., Automated Access Determination Module 300, Unwanted Human Access Determination Module 400, Price Mining Prevention Module 500, Marketing Campaign Adjustment Module 600). The Software 222 may also reside, completely or at least partially, within the Main Memory 204 and/or within the Processor 202 during execution thereof by the Computer 200, with the Main Memory 204 and/or the Processor 202 also constituting computer-accessible storage media. The Software 222 may further be transmitted or received over One or More Networks 115 via a Network Interface Device 208.

While the Machine-Accessible Storage Medium 230 is shown in an example embodiment to be a single medium, the terms "computer-accessible storage medium" and "computer-readable medium" should be understood to include a single medium or multiple media (e.g., a centralized or distributed database, and/or associated caches and servers) that store the one or more sets of instructions. The terms "computer-accessible storage medium" and "computer-readable medium" should also be understood to include any medium (e.g., non-transitory medium) that is capable of storing, encoding, or carrying a set of instructions for execution by the Computer 200 and that cause the Computer 200 to perform any one or more of the methodologies of the present invention. The terms "computer-accessible storage medium" and "computer-readable medium" should accordingly be understood to include, but not be limited to, solid-state memories, optical and magnetic media, etc.

Example System Platform

Various embodiments of a system for preventing price and other data mining on one or more online retail websites and for dynamic online marketing campaign adjustment according to various embodiments are described below and may be implemented in any suitable context. Various aspects of the system's functionality may be executed by certain system modules, including Automated Access Determination Module 300, Unwanted Human Access Determination Module 400, Price Mining Prevention Module 500, and Marketing Campaign Adjustment Module 600. These modules are discussed in greater detail below.

It should be understood by reference to this disclosure that the methods describe an exemplary embodiments of method steps carried out by the present system, and that other exemplary embodiments may be created by adding other steps, by removing one or more of the method steps, or performing one or more of the method steps in an order other than the order in which they described in figures. Exemplary functionality of certain embodiments of the system is described below.

Automated Access Determination Module

Figure 3:
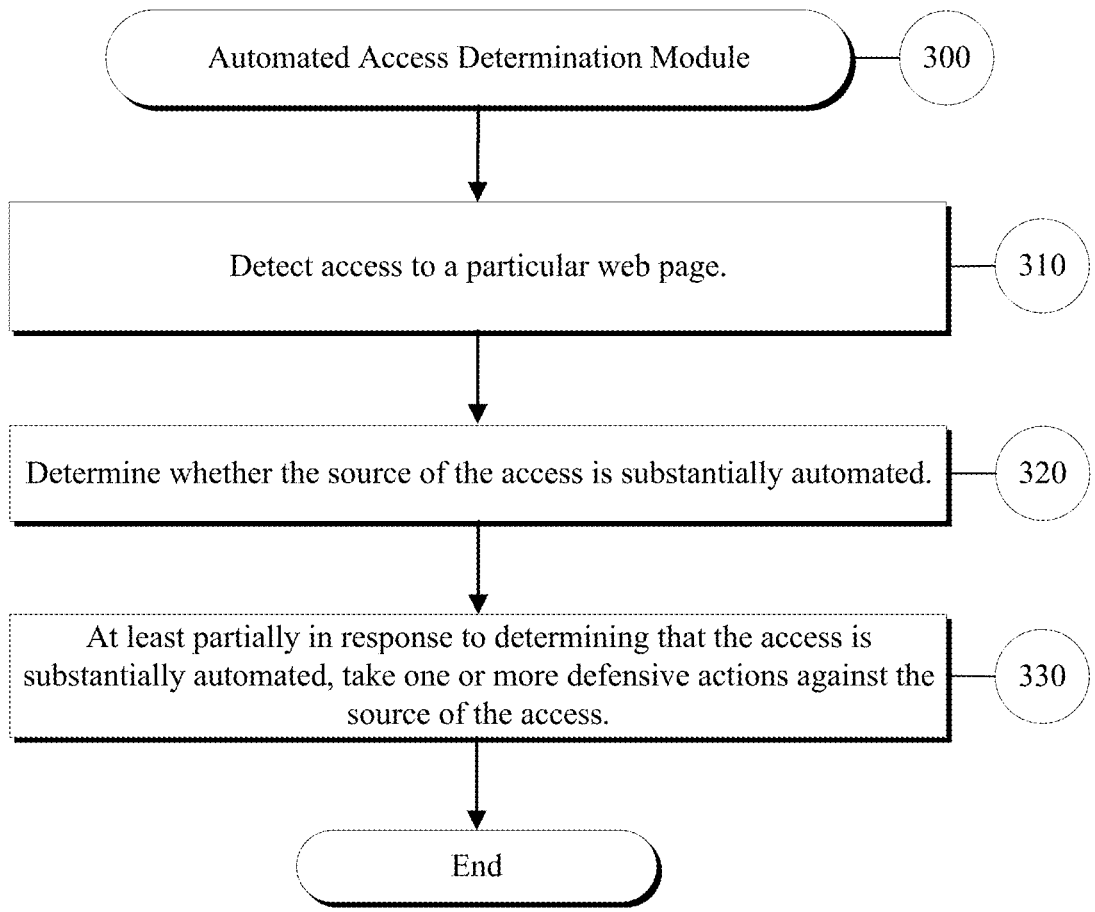
FIG. 3 depicts a flow chart that generally illustrates various steps executed by an automated access determination module that, for example, may be executed by the system of FIG. 1.

FIG. 3 is a flow diagram of an exemplary Automated Access Determination Module 300. The Automated Access Determination Module 300 may, for example, be implemented by a computer system such as the System 110 of FIG. 1. Returning to FIG. 3, at Step 310, the system begins by detecting access to a particular web page. In various embodiments, the system is configured to detect access in response to receiving a request to access the particular web page. The request to access the web page may occur when the web page is accessed from a link provided by a search engine, when the web page is accessed from an advertising link on a separate web page, or when the web page is accessed directly by the web page address being entered into the address bar of a suitable internet browser.

When the system detects access to the web page at Step 310, the system may, for example, collect data associated with the source of the access such as the IP address, the operating system information, the web browser information, the user agent string, the search terms used to access the web page, the advertising link used to access the web page, or other information relating to the method used to access the web page or the source of the access.

The system then advances to Step 320, where it determines, at least partially based on the data associated with the source of the access, whether the source of the access may be substantially automated. In various embodiments, the system is configured to detect substantially automated access such as by one or more bots or one or more web crawlers. The system may use the data associated with the source of the access to determine that the access is substantially automated by retrieving information on access patterns of the source of the access. Such access patterns may include the frequency of the access and the number of web pages accessed within a particular website. For instance, if the access pattern shows that a particular IP address frequently accesses the same web page, the system may determine that the source of the access is automated. In addition, if the system detects that a particular IP address accesses every web page of a particular website, the system may also determine that the source of the access is automated.

Access patterns may also include similar access patterns based on other factors than the data associated with the source. For instance, the system may determine access patterns based on frequent access to web pages for particular products, for instance, an Apple iPad Air, or for particular types of products, for instance, a tablet computing device. The system may, for example, be configured to determine that a particular access is substantially automated based at least in part on determining that a source of access accesses one or more products from a particular class of products during a particular access of a particular website.

For example, a source of access may access one or more web pages of a particular online retail website during a particular visit. The system may determine, for example, that the source of access has accessed a greater number of product pages during a particular visit than a typical user (e.g., a typical online shopper) would access during a typical visit. For example, the system may determine that a typical user, when shopping for televisions, visits a product page for a particular number of televisions before making a purchase (e.g., the user may view information for between about 4 and about 6 televisions before making a purchase). In such embodiments, the system may determine that a source of access that views product and pricing information for more than about ten different televisions during the visit is likely to be a substantially automated access (e.g., because a typical user would not likely have viewed so many televisions during a single visit). In various embodiments, the system may determine that a source of access viewing product information for such a large number of products is more likely to be a source that is simply substantially automatically mining data rather than a legitimate user of the website.

In advancing to Step 330, the system then, at least partially in response to determining that the access is substantially automated, takes one or more defensive actions against the source of the access. In various embodiments, the defensive action may include determining whether the source of the access is a human. In various embodiments, the system may determine whether the source is a human by requiring registration of a user account to continue to access the web page. If no user account is created, the system may deny access to the web page from the particular source. In other embodiments, the system may require completion of a CAPTCHA before the source can continue to access the web page. At least partially in response to determining that the source of the access has not completed the CAPTCHA, the system may deny access to the web page. In still other embodiments, the system may take any other suitable defensive action to verify that the source is a human and not an automated source.

Unwanted Human Access Determination Module

Figure 4:
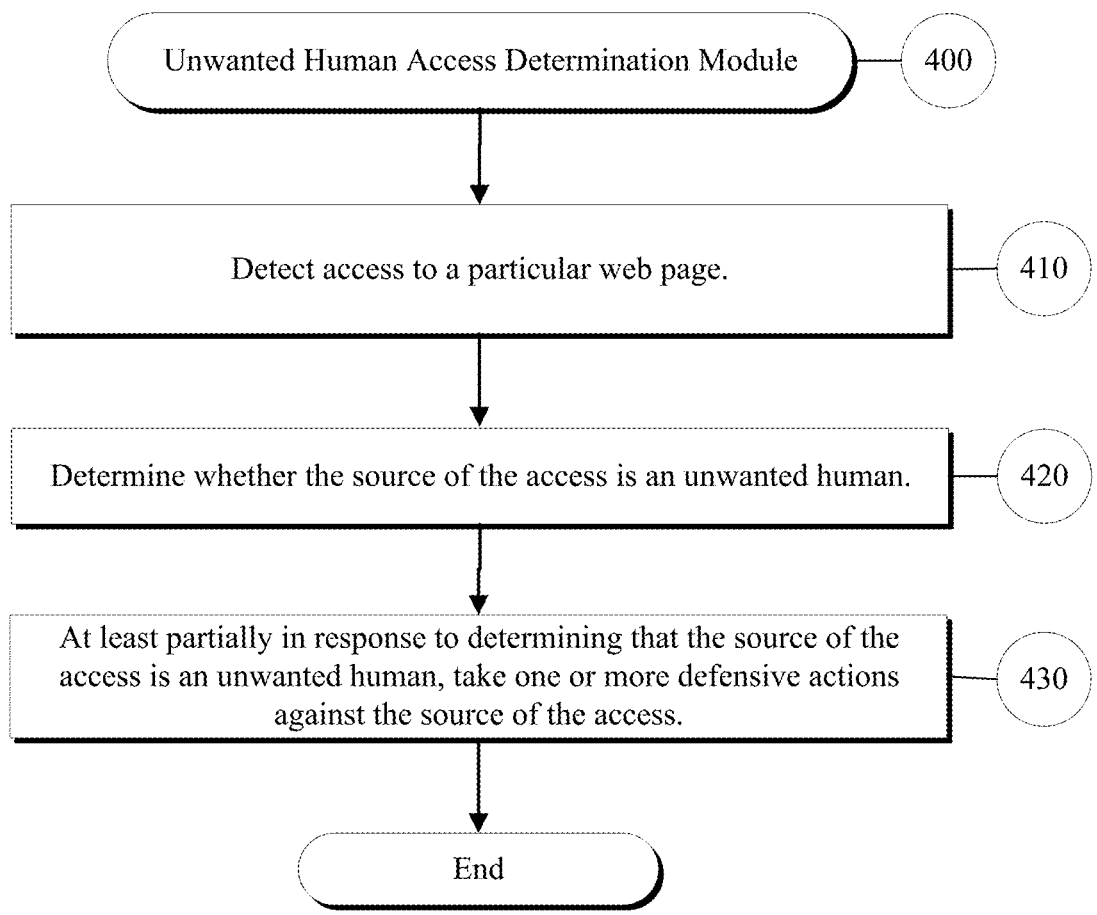
FIG. 4 depicts a flow chart that generally illustrates various steps executed by an unwanted human access determination module that, for example, may be executed by the system of FIG. 1.

FIG. 4 is a flow diagram of an exemplary Unwanted Human Access Determination Module 400. The Unwanted Human Access Determination Module 300 may, for example, be implemented by a computer system such as the System 110 of FIG. 1. Turning again to FIG. 4, the system begins at Step 410 by detecting access to a particular web page. In various embodiments, the system is configured to detect access in response to receiving a request to access the particular web page. The request to access the web page may occur when the web page is accessed from a link provided by a search engine, when the web page is accessed from an advertising link on a separate web page, when the web page is accessed directly from the web page address being entered into the address bar of a suitable internet browser, or in any other suitable way.

When the system detects access to the web page at Step 410, the system, in various embodiments, collects data associated with the source of the access such as: (1) IP address information; (2) operating system information; (3) web browser information; (4) one or more user agent strings; (5) one or more search terms used to identify and/or access the web page; (6) an advertising link used to access the web page; and/or (7) other information relating to the method used to access the web page and/or the source of the access. The system may, in particular embodiments, collect other information about the source of the access including an email address if the source has a registered account for the web page, or other information associated with the registered account such as, for example, a name of the user, an address of the user, etc.

Proceeding to Step 420, the system determines, based at least in part on information associated with the source of the access, whether the source of the access may be an unwanted human. The system may gather this information, for example, from the IP address of the source, the email address if the source has a registered account with the web page, the operating system of the source, the web browser information of the source, the user agent string of the source, or any other suitable information. In a particular embodiment, the system is configured to determine a location (e.g., a particular city or area from which the source of the access originates) of the source of the access (e.g., based at least in part on an IP address of the source) and further determine whether the determined location may be a location from which access is not desired. For example, the system may determine that the location of the source is a location associated with a particular competitor, particular independent company that is known for providing price-mining or other data-mining services, etc. The system may, in response to making such a determination, determine that the source is an unwanted one.

In various embodiments, the source of the access may register or have a registered account for the web page the user is accessing that is the same email address used on another web site such as a social networking site, a professional networking site, or other website (e.g., Facebook, LinkedIn, Twitter, Google, Spokeo, Pipl, county tax assessor's property records, etc.). The system, in various embodiments, may then conduct a search (e.g., an automated search) of these websites in order to determine, for example, the source's name, alma mater(s), occupation, one or more businesses the source is following (e.g., on the social media website), one or more groups the source is a part of, one or more businesses where the source has "checked in," current and past employers of the source, one or more addresses of the source, one or more neighbors of the source based on the current or previous address, one or more friends or connections of the source, one or more relatives of the source, the current and past employers of the neighbors and/or friends or relatives, etc.

After gathering the information on the source of the access, the system may determine that the source accessing the web page may be an unwanted human based on the source being an employee or independent contractor of a competitor, a friend of an employee of a competitor, a relative of an employee of a competitor, a neighbor of an employee of a competitor, or any other person that is likely to be attempting to gain access to the web page for pricing or other information. For example, if the system determines that the same email address used to register at the website was the same email address linked to a specific Facebook account, the system may (e.g., at least substantially automatically) access the source's Facebook page to determine the employer of the source of the access. In a particular example, in response to the system determining that the employer of the source of the access is a competitor to the owner of the web page being accessed, the system may determine that the source of the access is an unwanted human. Similarly, the system may also be configured to see employers of the friends of the source of the access who do not have such access protected with privacy settings. In response to the system determining that the employer of the friend of the source of the access is a competitor to the owner of the web page being accessed, the system may determine that the source of the access is an unwanted human.

In particular embodiments, the system is further configured to determine that the source of the access is an unwanted human based, at least in part, on other information related to the source. For instance, in response to the system determining that the IP address is associated with owned by a competitor, the system may determine that the source is an unwanted human. In addition, if the email address of the source of the access is owned by a competitor, the system may determine that the source is an unwanted human. In other embodiments, the system may be configured to determine whether a domain associated with the email address of the source is associated with a potential competitor, or one or more potential third party companies that a competitor may have contracted with to mine pricing information and other data. The system may, for example, conduct a string search of an email address associated with the source to determine whether the name of a particular entity is included in the e-mail address or the e-mail domain. In various embodiments, the one or more third party companies may include, for example, one or more law firms, one or more auditing companies, one or more price consulting companies, or any other company which may be mining pricing data. Furthermore, if the geographic region associated with the IP address of the source of the access is similar to or the same as the geographic region where a competitor has an office, the system may determine that the source is likely to be an unwanted human.

In the next step, Step 430, the system, at least partially in response to determining that the source of the access is an unwanted human, takes one or more defensive actions against the source of the access. In various embodiments, the defensive action can be to block the source of the access to the web page. The system may block the source by blocking the IP address associated with the unwanted human. In other embodiments, the system may, for example, limit a number of access by the particular source determined to have been an unwanted human (e.g., to only 1, 2, 3, 4, 5 or other predetermined number of visits within a particular time period, such as per day). In particular embodiments, the system is configured to limit a number of accesses by a source determined to have been an unwanted human to between one and ten accesses per day (e.g., 2, 3, 4, 5, 6, or 7 accesses per 24 hour period). Such a course of action may, for example, enable the system to prevent an unwanted human from mining data from a particular online retail web site, but still allow the unwanted human to patronize the online retail website (e.g., to shop on the online retail website outside the context of the user being an employee of a competitor). In other embodiments, the system may take any other suitable defensive action to block or otherwise limit the access to the website of the unwanted human.

Price Mining Prevention Module

Figure 5:
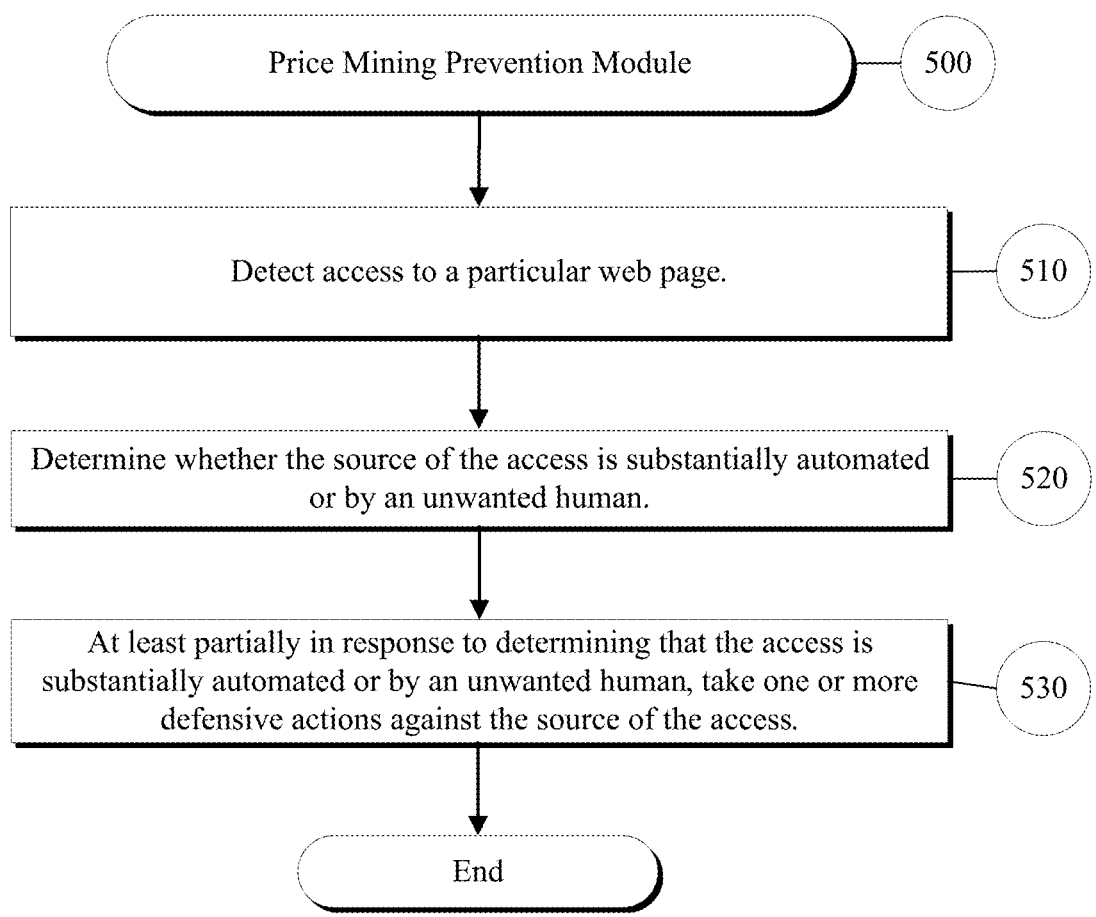
FIG. 5 depicts a flow chart that generally illustrates various steps executed by a price mining prevention module that, for example, may be executed by the system of FIG. 1.

FIG. 5 is a flow diagram of an exemplary Price Mining Prevention Module 500. The Price Mining Prevention Module 500 may, for example, be implemented by a computer system such as the System 110 of FIG. 1. Turning again to FIG. 5, the system begins at Step 510 by detecting access to a particular web page. In various embodiments, the system is configured to detect access in response to receiving a request to access the particular web page. The request to access the web page may occur when the web page is accessed from a link provided by a search engine, when the web page is accessed from an advertising link on a separate web page, or when the web page is accessed directly from the web page address being entered into the address bar of a suitable internet browser.

In response to detecting access to the web page at Step 510, the system, in various embodiments, collects data associated with the source of the access such as: (1) IP address information; (2) operating system information; (3) web browser information; (4) one or more user agent strings; (5) one or more search terms used to identify and/or access the web page; (6) an advertising link used to access the web page; and/or (7) other information relating to the method used to access the web page and/or the source of the access. The system may, in particular embodiments, collect other information about the source of the access including an email address if the source has a registered account for the web page, or other information associated with the registered account such as, for example, a name of the user, an address of the user, etc.

Next, in Step 520, the system determines whether the access is substantially automated or by an unwanted human. In determining whether the access is substantially automated, the system, in various embodiments, may undergo the same process detailed in Step 320 in FIG. 3. Similarly, in determining whether the access is by an unwanted human, the system may undergo the same process detailed in Step 420 in FIG. 4.

Returning to FIG. 5, after completing Step 520, the system proceeds to Step 530 where, at least partially in response to determining that the source of the access may be substantially automated or by an unwanted human, the system take one or more defensive actions against the source of the access. Such defensive actions may include, for example, blocking access to the web page, requiring the source of the access to register for a user account, or requiring the source of the access to complete a CAPTCHA. Requiring the source to register with the web page may enable the system to collect more information about the source to determine with greater certainty that the source is an unwanted human. In addition, if no user account is created, the system may be configured to deny access to the web page. In various embodiments, the system is configured to block access at the router level, at the network level, on a software level, or in any other suitable manner.

In various embodiments the system is configured to further determine whether a source determined to be substantially automated is, in fact, unwanted. In such embodiments, the system may be configured to determine whether a substantially automated source is a favorable source, such as a search engine web crawler or other favorable source, which may, for example, direct or increase traffic to the particular web page. In such embodiments, the system is configured to determine whether the substantially automated source may be favorable, and, in response to determining that it may be favorable, not take any defensive action against that particular favorable automated source.

In other embodiments, the system is configured to provide access to a modified version of a web page to one or more sources of access that the system has determined to be unwanted. The system may, for example: (1) determine that a potentially unwanted source of access is attempting to access a particular web page; (2) at least partially alter data associated with the particular web page to create a modified web page; and (3) provide access to the unwanted source of access to the modified web page. In various embodiments, the data associated with the particular website that the system is configured to at least partially alter may include, for example, pricing information for a particular product, one or more specifications associated with a particular product, or any other suitable product or other data which an unwanted user may be attempting to ascertain.

In particular embodiments, the system is configured to alter pricing information for a particular product on a particular product web page so that the particular product web page displays incorrect pricing information (e.g., pricing information that is higher or lower than the actual price at which the product is offered for sale on the particular web page). In other embodiments, the system is configured to display the correct pricing information as an image rather than as text (e.g., which may, for example, make it more difficult for a source mining pricing information from easily ascertaining pricing information from the particular product page). In still other embodiments, the system is configured to not display any pricing information in response to determining that a potentially unwanted source of access is attempting to access the particular product page. In such embodiments, the system may be configured to allow an unwanted source of access to successfully mine incorrect data.

Marketing Campaign Adjustment Module

Figure 6:
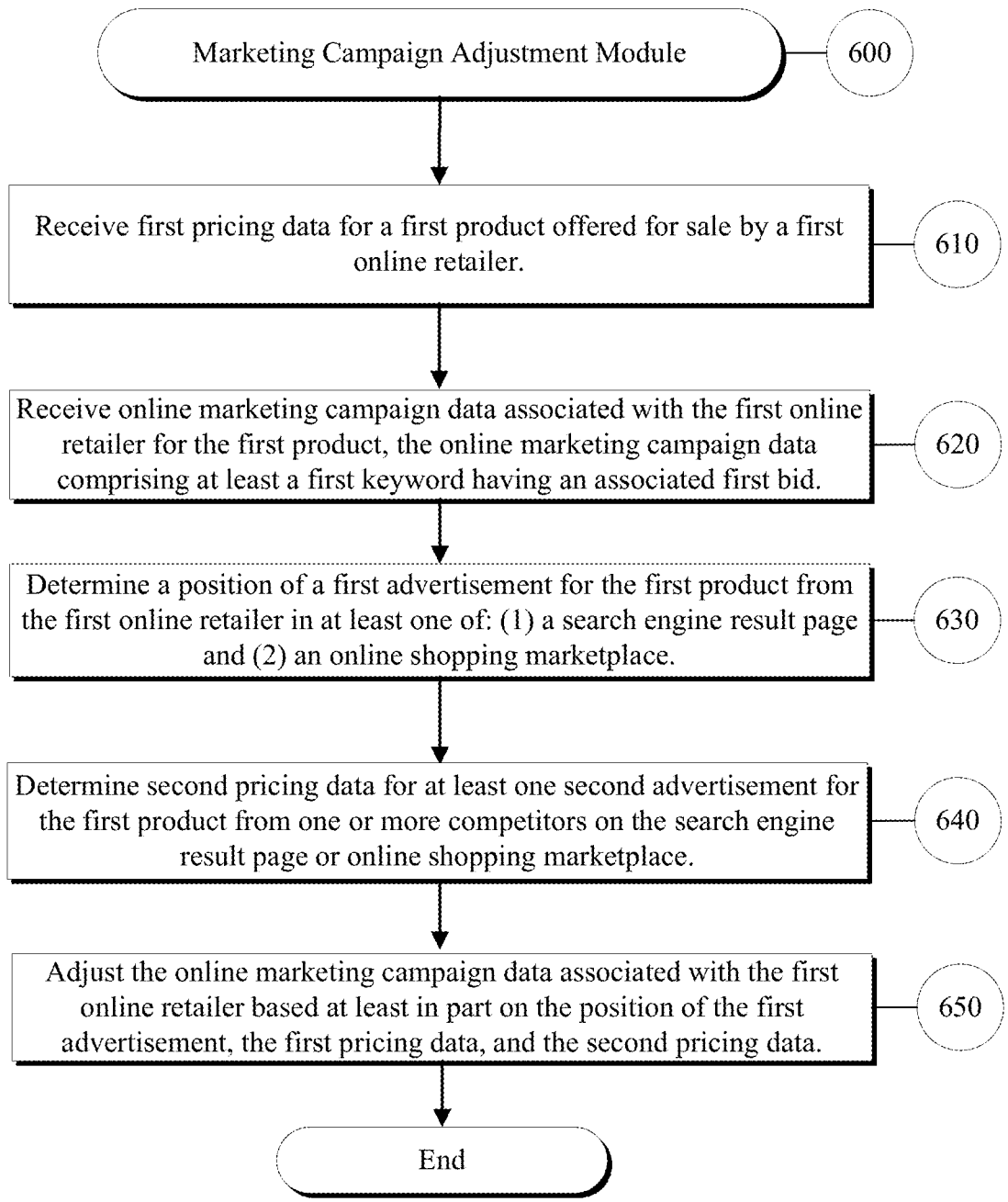
FIG. 6. depicts a flow chart that generally illustrates various steps executed by a marketing campaign adjustment module that, for example, may be executed by the system of FIG. 1.

FIG. 6 is a flow chart of operations performed by an exemplary Marketing Campaign Adjustment Module 600, which may, for example, run on the One or More Marketing Campaign Servers 120, or any suitable computing device (such as a suitable mobile computing device). In particular embodiments, the Marketing Campaign Adjustment Module 600 may facilitate an adjustment of one or more bids for one or more keywords in an online marketing campaign based on pricing data and a position of a particular advertisement on a search engine results, an online marketplace, or any other suitable location. In various embodiments, the system is configured to enable a particular retailer to provide one or more business rules (e.g., one or more marketing campaign business rules, one or more marketing campaign adjustment preferences, etc.) upon which the system may facilitate such an adjustment (e.g., a business rule to reduce one or more bids unless the particular retailer is offering a particular product at a price lower than one or more competitors). In various embodiments, the one or more business rules comprise one or more marketing campaign adjustment preferences.

When executing the Marketing Campaign Adjustment Module 600, the system begins, at Step 610, by obtaining first pricing data for a first product offered for sale by a first online retailer. In various embodiments, the system is configured to retrieve the first pricing data from one or more databases (e.g., one or more databases stored in memory) associated with the first online retailer. For example, the system may be configured to retrieve pricing data associated with a first product from the first online retailer substantially automatically. In other embodiments, the system is configured to receive the first pricing data in any other suitable manner (e.g., querying a database of pricing data, receiving input of the first pricing data from a user of the system, etc.).

In particular embodiments, the pricing data comprises a price of the first product (e.g., a price at which the first product is offered for sale from the first online retailer), as well as other suitable information about the first product such as, for example: (1) the product's formal name and any equivalents or abbreviations of that name; (2) other alphanumeric product identification information that may be used to identify the product (e.g., the product's make, model, SKU, etc.); (3) one or more symbols that may be used to identify the product (e.g., one or more logos associated with the product or the product's source); (4) one or more images of the product; (5) a description of the product (e.g., such as features of the product); (6) product model information; and/or (7) any other suitable information that may be used to identify the product.

Continuing at Step 620, the system is configured to receive online marketing campaign data associated with the first online retailer for the first product. In various embodiments, the online marketing campaign data comprises any suitable data related to one or more online marketing campaigns associated with the first product that are currently being run by the first online retailer. In particular embodiments, the system is configured to receive the online marketing campaign data in response to transmitting a request (e.g., over the Internet) to a third party keyword bidding server (e.g., a third party keyword bidding server associated with a keyword advertising service such as Google Adwords through which the first online retailer has initiated an online marketing campaign).

In various embodiments, the online marketing campaign data comprises data associated with a keyword-bidding advertising system. In such embodiments, the online marketing data comprises at least one first keyword associated with the online marketing campaign and a first bid associated with the at least one first keyword. In various embodiments, the at least one keyword includes at least one keyword that is related to the particular product. For example, if the particular product is a particular model of television (e.g., a 55 inch Samsung 4 k LED television), the online marketing campaign may include at least one keyword that includes 'Samsung', '4 k', 'LED', '55 inch', or any other suitable keyword which the first online retailer may desire to include in the online marketing campaign (e.g., any suitable keyword that the first online retailer believes a person who may be interested in purchasing a 55 inch Samsung 4 k LED television might search for using an Internet search engine). In various embodiments, a particular keyword may comprise a plurality of words, a combination of words, a single word, a phrase, or any other suitable combination of alphanumeric or other characters. In various embodiments, a particular retailer may have a plurality of online marketing campaigns for a plurality of different products.

As may be understood by one skilled in the art, a particular bid on a particular keyword by a retailer may, for example, influence (along with one or more additional factors) a position in which an advertisement for a particular product offered for sale by the retailer may appear in a search engine results page associated with the particular keyword (e.g., on a search engine results page resulting from a search that includes the particular keyword) or in an online shopping marketplace. In various embodiments, the online marketing campaign data may include a first bid associated with the at least one first keyword. In still other embodiments, the online marketing campaign data may include a bid for each particular keyword that makes up the online marketing campaign (e.g., an online marketing campaign for a particular product may include a plurality of keywords, each having an associated bid). In still other embodiments, the online marketing campaign data may include a maximum bid associated with each particular keyword. In still other embodiments, the online marketing campaign data may include a bid range for each particular keyword. In various embodiments, each bid may include a particular price the retailer is willing to pay for each incidence of a user clicking a link to the retailer's advertised product following a search on the search engine, by the user that includes the associated keyword.

Continuing to Step 630, the system continues by determining a position of a first advertisement for the first product from the first online retailer in at least one of: (1) a search engine results page; and (2) an online marketplace. The system may, for example, determine the position of a first advertisement for the first product from the first online retailer in a search engine results page by: (1) running a search (e.g., a simulated search) using a particular search that comprises at least one keyword that makes up part of the online marketing campaign; and (2) determining, based at least in part on a resulting search engine results page, a position of the first advertisement for the first product from the first online retailer within the search engine results page (e.g., relative to one or more other advertisements for the first product on the search engine results page).

In particular embodiments, a simulated search may generate a search engine results page that is substantially similar (e.g., the same as) a search engine results page that a user of the search engine would see in response to performing a search for a particular word or combination of words. In various embodiments, the system is configured to simulate one or more searches that include each particular keyword that make up the online marketing campaign. In still other embodiments, the system may determine one or more actual search results resulting from an Internet search via one or more particular search engines. In still other embodiments, the system is configured to simulate one or more searches that include one or more combinations of keywords associated with the online marketing campaign. In various other embodiments, the system is configured to simulate one or more searches for every possible combination of keywords that make up the online marketing campaign.

As may be understood by one skilled in the art, a position of an advertisement for a particular product from a particular retailer may vary based at least in part on which particular keyword or combination of keywords for which the system performed a simulated search. For example, a particular advertisement from Amazon.com for the 55 inch 4 k Samsung television described above may appear first on a search engine results page following a search for the term "55 inch Samsung television" but may appear third in a listing of search engine results page following a search for the term "55 inch television." In various embodiments, the system is configured to determine a position of the first advertisement for each particular keyword that makes up the online marketing campaign. In various other embodiments, the system is configured to determine the position of the first advertisement for one or more combinations of the one or more keywords that make up the online marketing campaign. In still other embodiments, the system is configured to determine the position of the first advertisement for every possible combination of keywords that make up the online marketing campaign.

For example, for an online marketing campaign for a particular product that includes a bid for a first keyword, a second keyword, and a third keyword, the system may be configured to determine a position of an advertisement for the particular product from the particular retailer on a search engine results page resulting from a search for: (1) just the first keyword; (2) just the second keyword; (3) just the third keyword; (4) the first keyword and the second keyword; (5) the first keyword and the third keyword; (6) the second keyword and the third keyword; and (7) the first keyword, the second keyword, and the third keyword.

As may be understood by one skilled in the art, the position of the first advertisement may vary over time (e.g., even if a bid for a particular keyword remains the same) for various reasons. For example, the position of the first advertisement may vary due to: (1) one or more changes in one or more keyword bids by one or more other advertisers; (2) one or more changes in other factors that may influence a position of the first advertisement (e.g., quality score, retailer website traffic, click through rate, etc.). Accordingly, in various embodiments, the system is configured to determine the position of the first advertisement substantially regularly (e.g., on a regular basis). For example, in various embodiments, the system is configured to determine the position: (1) every day; (2) every hour; (3) every minute; and/or (4) any other suitable time period. In other embodiments, the system is configured to determine the position substantially continuously (e.g., continuously).

In various other embodiments, the system is configured to determine the position with a frequency determined by an amount of computing resources (e.g., processing power, network bandwidth, etc.) assigned to the task of determining the position. In various embodiments, the system may be configured to enable a retailer to assign particular computing resources on a product-by-product, keyword-by-keyword, or any other suitable basis. In such embodiments, the system may enable the retailer to dedicate greater computing resources to products or keywords which may, for example, be more competitive (e.g., which may have a greater number of retailers bidding on particular keywords or particular keywords associated with the particular product) such that the position of the first advertisement for the particular product may vary more frequently.

Although the position of the first advertisement above is described generally with respect to being listed first, second, third, etc. within a search engine results page, it should be understood that, in various embodiments, a search engine results page may generally have portions of the search engine results page that are more or less desirable for the placement of advertisements. For example, in various embodiments, a search engine results page may include one or more advertisements adjacent an upper portion of the search engine results page. In other embodiments, the search engine results page may further include one or more advertisements adjacent a left portion, right portion, central portion, or lower portion of the search engine results page. In still other embodiments, various of the one or more advertisements within a particular search engine results page may vary in size (e.g., some may be larger in size and others may be smaller). In some embodiments, some of the one or more advertisements on the search engine results page may be in color while others are in black and white. In various embodiments, one or more advertisements may include one or more images (e.g., video images or still images), may include bolded or underlined text, etc.

As may be appreciated by one skilled in the art, an amount of screen space dedicated to a particular advertisement as well as one or more additional factors such as: (1) position; (2) color; (3) font; (4) font size; (5) contrast; (6) inclusion of images; (7) listing of price within the advertisement; (8) etc. may affect a desirability of a particular advertisement within a search engine results page (e.g., relative to one or more other advertisements on the search engine results page). For example, consider a search engine results page having: (1) a first advertisement disposed adjacent a top portion of the search engine results page containing bolded text in a large size font; and (2) a second advertisement disposed adjacent a lower right portion of a search engine results page in a small, non-bolded font. In this example, the first advertisement is likely more desirable from an advertiser perspective, for example, because the first advertisement would likely appear more prominent to a user viewing the search engine results page (e.g., and may, in turn, be more likely to be clicked by the user).

Continuing to Step 640, the system continues by determining second pricing data for at least one second advertisement for the first product from one or more competing retailers on the search engine results page or online marketplace. The system may, in various embodiments, determine pricing data for each advertisement for the particular product on the search engine results page. In other embodiments, the system may determine a position of each advertisement on the search engine results page in addition to a price of the particular product in each advertisement. In various embodiments, the system is configured to determine the second pricing data from the at least one second advertisement itself. In other embodiments, the system is configured to access a landing page associated with the at least one second advertisement and determine the pricing data from the landing page.

In particular embodiments, the system is further configured to determine a position of the at least one second advertisement (e.g., on the search engine results page). In other embodiments, the system is configured to determine the position of the at least one second advertisement relative to the first advertisement (e.g., to determine which advertisement is in a more desirable position on the search engine results page such as a higher position, more prominent position such as the top of the page versus the side of the page or the left side of the page versus the right side, etc.). In still other embodiments, the system is configured to compare a size, layout, color profile, font size, etc. of the first advertisement with the at least one second advertisement.

Continuing to Step 650, the system adjusts the online marketing campaign based at least in part on the position of the first advertisement, the first pricing data, and the second pricing data. In particular embodiments, adjusting the online marketing campaign may include for example: (1) adjusting (e.g., increasing or decreasing) the one or more bids on the one or more keywords; (2) ceasing the one or more bids on at least one of the one or more keywords; (3) creating one or more additional bids on one or more new keywords; and/or (4) taking any other suitable action.

In various embodiments, the system is configured to: (1) determine whether to adjust the online marketing campaign based at least in part on the one or more business rules; and (2) in response to determining to adjust the online marketing campaign, adjusting the online marketing campaign based at least in part on the position of the first advertisement, the first pricing data, and the second pricing data. In particular embodiments, the system is configured to adjust the online marketing campaign by, for example, transmitting a request to adjust the one or more bids to a third party keyword-bidding server. In other embodiments, the system is configured to adjust the online marketing campaign by transmitting a request to adjust one or more parameters relating to the marketing campaign to a particular online marketplace.

In various embodiments, the system further adjusts the online marketing campaign based at least in part on the one or more business rules provided by the retailer (e.g., or a user on behalf of the retailer). In particular embodiments, the system is configured to provide a user interface on a computing device associated with the first retailer. In various embodiments, the system is configured to cause a mobile or other computing device associated with a user associated with the first retailer to display the user interface on a display screen associated with the computing device. In various embodiments, the user interface may be embodied as a software application installed on the computing device. In other embodiments, the system may provide the user interface via a web-based application or in any other suitable manner. In particular embodiments, the system is configured to receive, via the user interface one or more business rules relating to an online marketing campaign (e.g., an online marketing campaign for a particular product). In particular embodiments, the system is configured to receive the one or more business rules at an online marketing campaign server over the Internet. In response to the use providing the one or more business rules, the system may store the one or more business rules in memory.

In various embodiments, the one or more business rules may include one or more business rules relating to one or more requests from the first retailer to make particular adjustments to the online marketing campaign based at least in part on particular conditions. For example, the system may receive one or more business rules relating to: (1) a request to increase one or more bids on one or more keywords related to a particular product in response to determining that a position of the first advertisement for the particular product is relatively low (e.g., not relatively desirable) while the price of the particular product from the first retailer is lower than from one or more retailers that have an advertisement that is in a higher position on a search engine results page or an online marketplace; or (2) a request to decrease one or more bids on one or more keywords related to a particular product in response to determining that a position of the first advertisement for the particular product is relatively high (e.g., first or second, or in a relatively desirable position) while the price of the particular product from the first retailer is higher than from one or more retailers that have an advertisement that is in a lower position on a search engine results page or an online marketplace.

In still other embodiments, the one or more business rules may include, for example: (1) a business rule to cease an online marketing campaign for a particular product for which the first retailer is not offering the product at the lowest price (e.g., the lowest price of the one or more retailers offering the particular product for sale via a particular search engine results page or online marketplace); (2) a business rule to increase a bid on a keyword for which the first retailer is competitive on price but for which an advertisement from the first retailer in not in the most desirable (e.g., most prominent) position on a search engine results page or online marketplace (e.g., a retailer may be competitive on price where their price for the particular product is within a certain threshold of one or more competitor's offered prices such as within a particular percentage such as 5%, 10%, between 0% and 10%, etc.); (3) a business rule to decrease a bid on a particular keyword for which a conversion rate (e.g., a rate at which clicks on an advertisement result in a sale or a rate at which a particular advertisements for a particular product or service result in a sale of the particular product or service) is below a particular rate (e.g., even if the particular product is competitively priced); (4) or any other suitable business rule related to pricing, position, etc. of a particular advertisement or a particular marketing campaign for a particular product.

In various other embodiments, the one or more business rules may include one or more rules in addition to one or more rules related to adjusting one or more bids in response to certain criteria being met. For example, the one or more business rules may include a business rule to decrease (e.g., automatically decrease) a price to within a particular percentage of one or more competitor prices in response to determining that a first advertisement from the first retailer for the particular product is placed desirably on the search engine results page, but the price of the first product from the first retailer is higher than one or more other advertisements on the search engine results page.

In particular embodiments, the system is configured to optimize the position of the first advertisement in relation to one or more other advertisements based at least in part on one or more considerations relating to a price of the first product offered for sale by the particular retailer with respect to the one or more competing retailers. For example, while it may be generally beneficial for the first retailer's advertisement to be positioned first in a search engine results page, the advertisement may not result in many clicks (e.g., or converted sales following clicks) by search engine users if an advertisement in the second position lists the product for a lower price. For example, on a search engine results page for "55 inch Samsung television," if a Walmart.com advertisement for the product is listed first for $499 and a Bestbuy.com advertisement is listed second for $479, users of the search engine seeking the televisions may be more likely to complete a purchase from Bestbuy.com. In this example, Amazon.com may be wasting money on their online marketing campaign when users click on their ad but instead choose to purchase from Bestbuy.com. If Amazon.com is unable to offer the television at a lower price, it may be beneficial for Amazon.com to reduce a bid on one or more associated keywords and to focus their advertising budget on other products on which they are more competitive in pricing.

In various embodiments, the system is further configured to adjust an online marketing campaign for a particular product based at least in part on an overall marketing budget for a plurality of products offered for sale by the first retailer. For example, the system may determine that one or more bids for one or more keywords associated with a first product offered for sale by the first retailer are too high. The system may further determine that one or more bids for one or more keywords associated with a second product offered for sale by the second retailer are too low. In particular embodiments, the system may, for example, adjust the one or more bids on the first product (e.g., by lowering the one more bids) and the one or more bids on the second product (e.g., by raising the one or more bids) relative to one another such that a resulting marketing spend may be substantially similar to a marketing spend prior to the adjustment. In various embodiments, this may enable a retailer to predict and control an overall marketing cost for various products for which it is advertising. In particular embodiments, such an allocation of marketing dollars may result in higher conversions through search engine advertising (e.g., higher sales), without increasing an overall cost of marketing (e.g., by allocating more marketing dollars to products that are competitively priced and not wasting advertising dollars on products that are priced higher than competitors which may result in relatively fewer sales).

In various embodiments, the system is configured to receive online marketing campaign data for a plurality of products offered for sale for a particular online retailer. The system may be further configured to receive marketing budget information associated with the first retailer. In various embodiments, in response to determining to decrease a first bid on a first keyword for a marketing campaign associated with a first product, the system may be configured to determine at least one second product for which an increase to a second bid on a second keyword may be desirable (e.g., based on any suitable factor discussed herein). The system may them be configured to reallocate one or more funds earmarked to pay for clicks from the lowered first bid to the second bid. For example, the system may proportionally increase the second bid based on estimated savings from having decreased the first bid.

Illustrative Examples

Exemplary Experience of the Automated Access Determination Module

The following describes an exemplary experience of the Automated Access Determination Module 300. In this example, to start, the system begins by determining that a user has accessed a particular web page, for instance, the home page of Amazon.com. The system then gathers information about the user including the user's IP address. In attempting to determine whether the user is an automated user such as a bot, the system prompts the user to complete a CAPTCHA. If the user fails to complete the CAPTCHA, the system blocks the user's access to the web page by blocking access to the IP address of the user.

Exemplary Experience of the Unwanted Human Access Determination Module

The following describes an exemplary experience of the Unwanted Human Access Determination Module 400. To begin, the system detects that a user has accessed a particular web page such as Amazon.com. In this case, the user sets up a user account with Amazon.com, entering information that includes, for example, the user's email address, name, address, phone number, etc. This allows the system to search other websites such as Facebook using the name or email address listed by the user in setting up the user's Amazon.com account. Upon determining from the user's Facebook account that the user is employed by Wal-Mart, the system can flag the user as a potential unwanted human and track the user's activity on Amazon.com to determine whether the user is simply shopping on the web site, or if the user is going through product listings more systematically so that it appears the user is mining Amazon.com for product pricing information. If the system determines that the user's search pattern is not reflective of the user simply shopping on the website, the system may determine an appropriate defensive action based on the activity of the user and implement the defensive action against the user.

The system may, for example: (1) receive user information from a user creating an account on a particular e-commerce website; (2) use the user information to access additional information associated with the user (e.g., the user's employer information) from a social media account associated with the user or other publicly available information associated with the user; and (3) determine whether to at least partially limit access to one or more web pages based at least in part on the employer information or other additional information.

Exemplary Experience of the Marketing Campaign Adjustment Module

Figure 7:
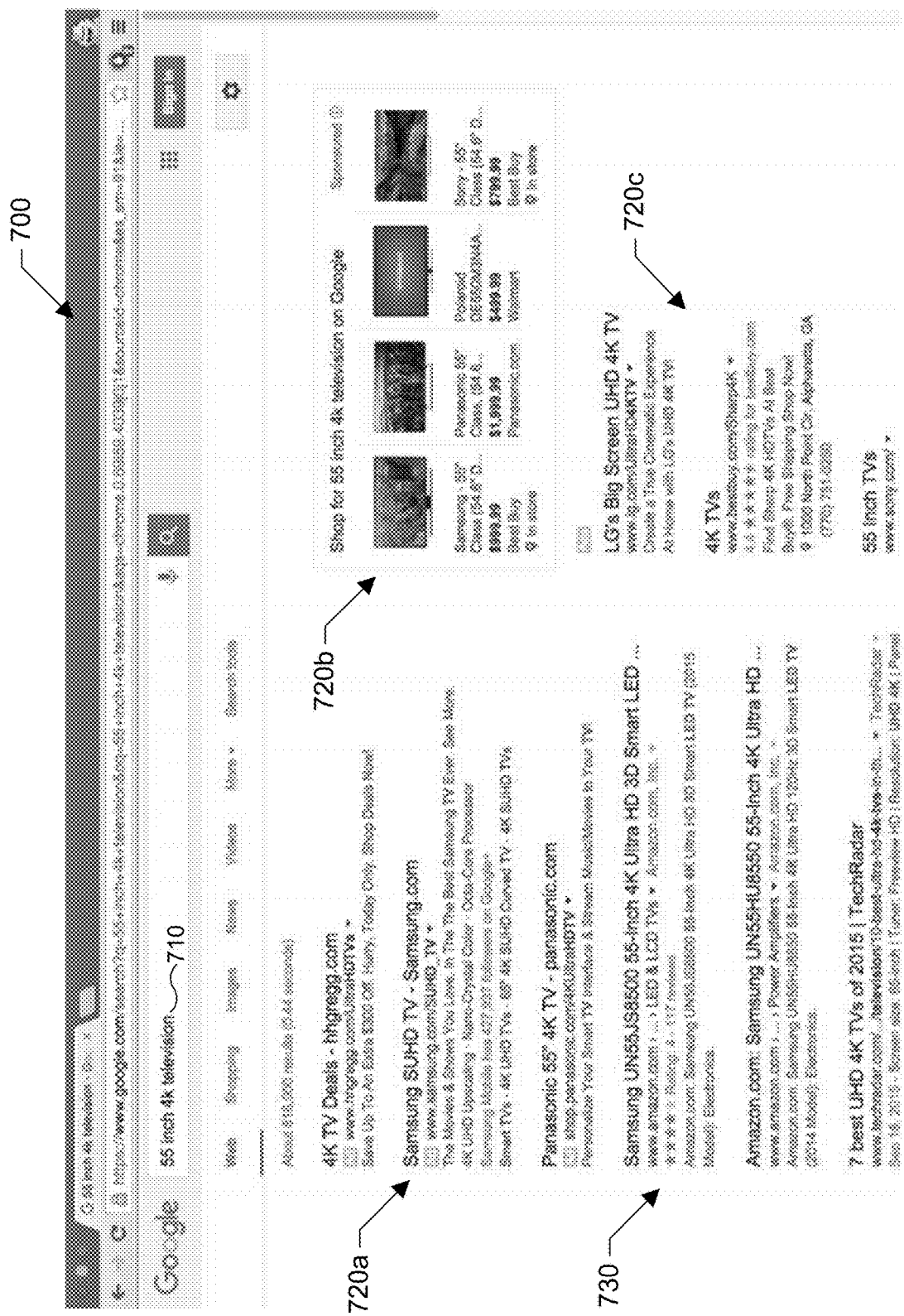
FIG. 7 depicts a screen capture of an exemplary search engine results page that comprises both organic search results and paid search results (e.g., one or more pay-per-click advertisements).

FIG. 7 depicts an exemplary search engine results page 700 resulting from a search query 710 for the term "55 inch 4 k television." In this example, a user of the search engine may be shopping for a television that is 55 inches in size and has "4 k" resolution. As may be understood from FIG. 7, the search engine results page 700 includes both advertised results 720a, 720b, 720c and organic results 730.

Particularly savvy shoppers may, for example, investigate (e.g., click on) multiple links to view particular retailer web pages in order to ascertain the best price before making a purchase decision. As may be understood by one skilled in the art, clicks on advertised search results may cost the advertiser (e.g., the particular retailer) money due to pay-per-click advertising. Accordingly, if a retailer's listing is high on the search engine results page 700 but does not include a competitive price for the product, the retailer may end up paying for the click without converting the sale.

In various alternative embodiments, the system may be configured to access links on the search engine results page 700 from the organic search results 730 in order to determine product pricing at the links. The system may, for example, access one or more links that make up part of the organic search results 730; and determine based at least in part on the accessed one or more links, a price for the particular product available at each of the one or more links. The system may be further configured to modify or adjust an online marketing campaign based at least in part on pricing data derived from these organic results 730. In particular embodiments, adjusting an online marketing campaign based on organic search results (e.g., or both organic and paid search results) may enable a particular retailer to save money on online marketing by avoiding paying for a click on one of the particular retailer's advertisements in a search engine results page where at least one of the links (e.g., either the organic search results 730 or the advertised results 720) enable a user of the search engine to purchase the particular product at a price lower than the price offered by the particular retailer.

As may be understood from FIG. 7, advertised search results 720b (e.g., shopping results) vary in price. For example, Panasonic may utilize the system described herein in various embodiments, which may, for example, reduce a bid associated with one or more of the "55 inch 4 k television" search terms because the listed price for such a Panasonic television is $1,999 while competitors list the price for $999.99 (Samsung), $499.99 (Polaroid, and $799.99 (Sony).

Alternate Embodiments

Various embodiments of a system for preventing price-mining and other data-mining may include features in addition to those features described above. Such alternative embodiments are described below.

Blacklisting Particular Sources

In various embodiments, the system is configured to blacklist particular sources of access (e.g., particular users, particular IP addresses, etc.) substantially without having to determine whether the source is an unwanted source. In such embodiments, the system may be configured to: (1) receive a listing of one or more sources to blacklist; and (2) substantially automatically block any attempted access by the one or more sources. In such embodiments, the system may be configured to receive the listing of one or more sources to blacklist from, for example, a company that has hired a third party company to prevent price mining on its web page, or from any other suitable source. In particular embodiments, the system may be adapted to automatically compile the blacklist by searching the Internet and/or other sources for indications that particular individuals are employed, in a potential price mining capacity, by one or more entities, such as competitors of the company, and then adding those particular individuals to the blacklist.

In other embodiments, the system may be configured to create a blacklist by, for example, using publicly available information to determine a list of employees of a particular competitor (e.g., via LinkedIn or another social media website, via the competitor's web page, etc.). In various embodiments, the system is configured to determine a blacklist of one or more individuals based at least in part on particular competitor employee's position with the competitor. For example, the system may be configured to blacklist all IT employees of a particular competitor or blacklist any other suitable employees of a competitor who may be involved (e.g., based at least in part on their position with the competitor) in price mining or other competitive activity.

Public Review and Forum Post Scanning

In various embodiments, the system is configured to scan reviews posted on one or more public web sites as well as posts made on one or more public message boards to determine whether the reviewer or the message board poster may be employed by a competitor or other third party company whose employees may engage in price mining. In such embodiments, the system may be configured to determine that the poster or reviewer is such an individual based at least in part on, for example: (1) content of the post or review; (2) a product or company for which the reviewer has made the review; (3) a topic of the message board; and/or (4) any other suitable factor.

In particular embodiments, the system may determine that a particular poster or reviewer is employed by a particular competitor by, for example, searching a post or review by the particular poster or reviewer for a particular word (e.g., or string of words) which may indicate that the poster or reviewer is employed by the particular competitor. For example, the system may search for instances in a post or review where the poster or reviewer mention an experience while employed by the competitor. In other embodiments, the system is configured to search a plurality of posts or reviews by the same poster or reviewer to ascertain that the poster or reviewer is an employee of the particular competitor. For example, a particular reviewer may post messages to a message board that includes references to their experience as a network administrator. The same reviewer may have posted several reviews for restaurants in Redmond, Wash. The system may, based on this information, determine that the reviewer is an employee of Microsoft, based on their job role and their frequent visits to Microsoft's city of headquarter. In response to determining that a poster or reviewer may be employed by a competitor or other unwanted company, the system may, for example: (1) determine the poster or reviewer's IP address, name, e-mail address; and (2) add that poster or reviewer to a blacklist to block access to that poster or reviewer.

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A computer-implemented method for processing online marketing campaign data and dynamically adjusting one or more keyword bids for an online marketing campaign for a first product offered for sale by a first advertiser, the method comprising:

receiving, by one or more processors via a first electronic communication, first pricing data associated with the first product offered for sale by the first advertiser, wherein the first pricing data comprises:
 (i) a first price for the first product;
 (ii) a name of the first product;
 (iii) an alphanumeric product identification code for the first product;
 (iv) one or more images of the first product; and
 (v) a description of the first product;

receiving, by the one or more processors via a second electronic communication, the online marketing campaign data for the first product, the online marketing campaign data comprising:
 a first keyword associated with the online marketing campaign; and
 a first bid for an online advertisement position associated with the first keyword;

automatically determining, by the one or more processors based at least in part on the first keyword, a first position of a first advertisement for the first product relative to one or more other advertisements for the first product associated with one or more competing advertisers on a search engine results page, wherein the first position is further determined for a particular first time and a first network bandwidth utilization at the particular first time, and based at least in part on a first amount of traffic on a website associated with the first advertiser at the particular first time;

automatically determining, by the one or more processors, second pricing data associated with a second advertisement for the first product of the one or more other advertisements for the first product, wherein the second pricing data comprises a second price for the first product;

automatically determining, by the one or more processors, a second position of the second advertisement for the first product relative to the first position of the first advertisement for the first product, wherein the second position is further determined for a particular second time and a second network bandwidth utilization at the particular second time, and based at least in part on a second amount of traffic on a website associated with the first advertiser at the particular second time;

automatically determining, by the one or more processors, that the second position of the second advertisement for the first product is at a position lower than the first position of the first advertisement for the first product;

automatically determining, by the one or more processors, that the second price for the first product is less than the first price for the first product;

at least partially in response to determining that the second position of the second advertisement for the first product is at the position lower than the first position of the first advertisement for the first product and that the second price for the first product is less than the first price for the first product, automatically lowering the first bid for the online advertisement position; and iteratively automatically determining, by the one or more processors based at least in part on resource utilization by the one or more processors, the first position of the first advertisement and the second position of the second advertisement.

2. The computer-implemented method of claim 1, further comprising:

providing, by the one or more processors, a user interface for providing one or more marketing campaign business rules;

causing, by the one or more processors, a mobile computing device associated with a user associated with the first advertiser to display the user interface on a display associated with the mobile computing device;

receiving, from the user, by the one or more processors, the one or more marketing campaign adjustment preferences; and storing, by the one or more processors, the one or more marketing campaign business rules in memory.

3. The computer-implemented method of claim 2, further comprising:

determining, by the one or more processors, based at least in part on the first pricing data and the second pricing data, whether the position of the first advertisement for the first product relative to the one or more other advertisements satisfies the one or more marketing campaign business rules; and at least partially in response to determining that the position of the first advertisement for the first product relative to the one or more other advertisements does not satisfy the one or more marketing campaign business rules, automatically adjusting the first bid for the online advertisement position, by the one or more processors, based at least in part on the one or more marketing campaign business rules.

4. The computer-implemented method of claim 3, wherein:

automatically adjusting the first bid for the online advertisement position based at least in part on the one or more marketing campaign business rules comprises transmitting, by the one or more processors, a request to adjust the first bid for the online advertisement position to a third party keyword bidding server over the Internet.

5. The computer-implemented method of claim 4, further comprising:

determining, by the one or more processors, third pricing data for the first product from one or more organic search results on the search engine results page;

comparing, by the one or more processors, the first pricing data with the third pricing data to determine whether the first pricing data satisfies the one or more marketing campaign business rules; and in response to determining that the first pricing data does not satisfy the one or more marketing campaign business rules, automatically adjusting the first bid for the online advertisement position, by the one or more processors, based at least in part on the first pricing data, second pricing data, and the position of the first advertisement for the first product relative to the one or more other advertisements.

6. The computer-implemented method of claim 5, wherein the one or more marketing campaign business rules comprise an instruction to increase the first bid for the online advertisement position in response to determining that the first pricing data comprises a price that is lower than the second and third pricing data and the position of the first advertisement is less desirable than the one or more other advertisements.

7. The computer-implemented method of claim 6, further comprising:

determining, by the one or more processors, whether the first pricing data comprises a price that is lower than the second pricing data and the third pricing data;

determining by the one or more processors, whether the position of the first advertisement is less desirable than the one or more other advertisements; and in response to determining that the first pricing data comprises a price that is lower than the second and third pricing data and the position of the first advertisement is less desirable than the one or more other advertisements, automatically transmitting a request to the third party keyword bidding server to increase the first bid.

8. The computer-implemented method of claim 5, wherein the one or more marketing campaign business rules comprise an instruction to cancel the first bid for the online advertisement position in response to determining that the first pricing data comprises a price that is higher than a price associated with the second pricing data or the third pricing data.

9. A computer-implemented method of processing online marketing campaign data for a particular product, the method comprising:

providing a user interface for inputting one or more business rules associated with an online marketing campaign associated with the particular product on a computing device associated with a first retailer;

receiving one or more business rules associated with the online marketing campaign at a marketing campaign server via the user interface over the Internet, the online marketing campaign server comprising one or more processors and a memory that stores the online marketing campaign data and first pricing data associated with the particular product, wherein:

the online marketing campaign data comprises one or more keywords and one or more bids associated with each of the one or more keywords, wherein each of the one or more bids is a bid for an online advertisement position; and the first pricing data comprises:
(i) a first price at which the particular product is offered for sale by the first retailer;
(i) a name of the particular product;
(iii) an alphanumeric product identification code for the particular product;
(iv) a symbol associated with the particular product; and
(v) a description of the particular product;

determining, by the one or more processors, a first position of a first advertisement for the particular product relative to one or more other advertisements for the particular product associated with one or more competing advertisers on a search engine results page derived from an Internet search comprising the one or more keywords, wherein the first position is further determined for a particular first time and a first network bandwidth utilization at the particular first time, and based at least in part on a first amount of traffic on a website associated with the first retailer at the particular first time;

determining, by the one or more processors, second pricing data for a second advertisement for the particular product of the one or more other advertisements for the particular product on the search engine results page, wherein the second pricing data comprises a second price for the particular product;

determining, by the one or more processors, a second position of the second advertisement for the particular product relative to the first position of the first advertisement for the particular product on the search engine results page, wherein the second position is further determined for a particular second time and a second network bandwidth utilization at the particular second time, and based at least in part on a second amount of traffic on a website associated with the first retailer at the second time;

determining, by the one or more processors, that the second position of the second advertisement for the on the search engine results page product is at a position lower on the search engine results page than the first position of the first advertisement for the particular product;

determining, by the one or more processors, that the second price for the particular product is less than the first price for the particular product;

at least partially in response to determining that the second position of the second advertisement for the particular product is at the position lower on the search engine results page than the first position of the first advertisement for the particular product and that the second price for the particular product is less than the first price for the particular product, automatically lowering at least one of the one or more bids; and iteratively determining, by the one or more processors based at least in part on resource utilization by the one or more processors, the first position of the first advertisement and the second position of the second advertisement.

10. The computer-implemented method of claim 9, wherein the method further comprises:
continuously determining, by the one or more processors, a current position of the first advertisement for the particular product on the search engine results page derived from the Internet search comprising the one or more keywords; and
continuously adjusting the one or more bids based at least in part on the current position of the first advertisement, the pricing data, the second pricing data, and the one or more business rules.

11. The computer-implemented method of claim 9, wherein lowering the at least one of the one or more bids comprises transmitting a request via the Internet to a third-party keyword bidding server to lower the at least one of the one or more bids.

12. The computer-implemented method of claim 9, wherein:
determining, by the one or more processors, that the second price for the particular product is less than the first price for the particular product comprises determining, based on the one or more business rules, that a difference between the second price for the particular product and the first price for the particular product is greater than a predetermined threshold.

13. The computer-implemented method of claim 9, wherein:
the one or more business rules comprise a request to increase a bid on a keyword associated with an online marketing campaign for a particular product in response to determining that that particular product is priced lower than a price for the particular product offered for sale by one or more competitors advertising the particular product; and
the method further comprises, in response to determining that the first pricing data is less than the second pricing data and that the first position of the first advertisement is not more desirable than the second position of the second advertisement, increasing the one or more bids on the one or more keywords by causing the online marketing campaign server to transmit a request via the Internet to a third-party keyword bidding server to increase the one or more bids based at least in part on the one or more business rules.

14. The computer-implemented method of claim 9, wherein:
the one or more business rules comprise:
a first rule to increase visibility of an advertisement for a product that is priced by the first retailer at a lower than a price offered by one or more competitors, wherein increasing visibility of the advertisement comprises increasing marketing spending on the product; and
a second rule to decrease marketing spending on the product if the product is prices by the first retailer at a higher price than the price offered by the one or more competitors.

15. A computer system for processing marketing campaign data for a first product based at least in part on one or more marketing adjustment preferences comprising:
an online marketing campaign server comprising one or more processors and a memory that stores the one or more marketing adjustment preferences, wherein the one or more processors are configured for:

providing, on a computing device associated with a first retailer, a user interface for providing the one or more marketing adjustment preferences;

receiving, via the user interface, the one or more marketing adjustment preferences, wherein the one or more marketing adjustment preferences comprise a request to lower a bid for an online advertisement position based at least in part on a first position and a first price of a first advertisement for the first product offered by the retailer relative to one or more second advertisements for the first product offered by one or more second retailers on a search engine results page;

storing the one or more marketing adjustment preferences in memory;

receiving, via a third party keyword bidding server, the marketing campaign data associated with the first product for an online marketing campaign initiated by the first retailer, the marketing campaign data comprising a first keyword and a first bid for a first online advertisement position associated with the keyword;

submitting a search engine query comprising the keyword, via the Internet, to a search engine associated with the online marketing campaign;

in response to submitting the search engine query, receiving a search engine results page;

determining a first position of the first advertisement for the first product from the first retailer relative to the one or more second advertisements for the first product from the one or more second retailers on the search engine results page, wherein the first position is further determined for a particular first time and a first network bandwidth utilization at the particular first time, and based on a first amount of traffic on a website associated with the first retailer at the particular first time;

determining second pricing data associated with a second advertisement for the first product of the one or more second advertisements for the first product, wherein the second pricing data comprises:
(i) a second price for the first product;
(ii) a name of the first product;
(iii) an alphanumeric product identification code for the first product;
(iv) one or more images of the first product; and
(v) a description of the first product;

determining a second position of the second advertisement for the first product relative to the first position of the first advertisement for the first product, wherein the second position is further determined for a particular second time and a second network bandwidth utilization at the particular second time, and based on a second amount of traffic on a website associated with the first retailer at the particular second time;

determining that the second position of the second advertisement for the first product is at a position lower on the search engine results page than the first position of the first advertisement for the first product;

determining that the first price of the first product from the first retailer is greater than second price for the first product;

determining, based at least part on the one or more marketing adjustment preferences, whether to adjust the first bid for the first online advertisement position based at least in part on determining that the second position of the second advertisement for the first product is at the position lower on the search engine results page than the first position of the first advertisement for the first product and that the first price of the first product from the first retailer is greater than second price for the first product;

in response to determining to adjust the first bid, transmitting a request to the third party keyword bidding server to lower the first bid for the first online advertisement position based at least in part on the one or more marketing adjustment preferences; and iteratively determining, based at least in part on resource utilization by the one or more processors, the first position of the first advertisement and the second position of the second advertisement.

16. The computer system of claim 15, wherein:
the one or more marketing adjustment preferences comprise a preference for the first advertisement to be a top advertisement on the search engine results page when the price of the first product from the first retailer is lower than the price of the first product from the one or more second retailers.

17. The computer system of claim 16, wherein:
the one or more marketing adjustment preferences comprise a preference for ceasing the marketing campaign for the first product when the price of the first product from the first retailer is higher than the price of the first product from the one or more second retailers.

18. The computer system of claim 17, wherein the one or more processors are further configured for:
determining a price charged for the first product at one or more organic search results on the search engine results page;
determining a relative price of the first product from the first retailer versus the price charged for the first product at the one or more organic search results on the search engine results page; and
determining, based at least part on the one or more marketing adjustment preferences, whether to adjust the first bid based at least on the relative price of the first product from the first retailer versus the price charged for the first product at the one or more organic search results on the search engine results page.

19. The computer system of claim 15, wherein:
the one or more marketing adjustment preferences comprise a request to decrease the first bid in response to determining that the first advertisement is positioned in a particular position with respect to the one or more second advertisements and the relative price of the first product is higher from the first retailer versus the one or more second retailers;
the one or more processors are further configured for determining whether the first advertisement is positioned in the particular position with respect to the one or more second advertisements and the relative price of the first product is higher from the first retailer versus the one or more second retailers; and
in response to determining that the first advertisement is positioned in the particular position with respect to the one or more second advertisements and the relative price of the first product is higher from the first retailer versus the one or more second retailers, transmitting the request to the third party keyword bidding server to adjust the first bid, wherein the request to adjust the first bid comprises a request to decrease the first bid by a first amount based at least in part on the one or more marketing adjustment preferences.

20. The computer system of claim 19, further comprising:
receiving online marketing campaign budget information associated with the first retailer;
receiving, via the third party keyword bidding server, other marketing campaign data associated with the one or more other products offered for sale by the first retailer, the other marketing campaign data comprising at least one bid and at least one keyword for each of the one or more other products;
for each of the one or more other products, submitting one or more search engine queries comprising the at least one keyword, via the Internet, to a search engine associated with the online marketing campaign;
in response to submitting the one or more search engine queries, receiving a search engine results page for each of the one or more other products;
determining a relative position of an advertisement for each of the one or more other products from the first retailer with respect to one or more competing advertisements for each of the one or more other products from the one or more competing retailers on each of the search engine results pages;
determining a relative price of each of the one or more other products from the first retailer versus the one or more competing retailers;
determining, based at least part on the one or more marketing adjustment preferences, whether to increase the at least one bid for at least one of the one or more other products based at least in part on the relative price of the at least one of the one or more other products from the first retailer versus the one or more competing retailers and the relative position of the advertisement for the at least one of the one or more other products from the first retailer with respect to the one or more competing advertisements for the at least one of the one or more other products from the one or more competing retailers; and
in response to determining: (1) that the first advertisement is positioned in the particular position with respect to the one or more second advertisements and the relative price of the first product is higher from the first retailer versus the one or more second retailers; and (2) to increase the at least one bid for the at least one of the one or more other products: transmitting a request to the third party keyword bidding server to increase the at least one bid for the at least one of the one or more other products by a second amount based at least in part on the first amount and the online marketing campaign budget information.

\* \* \* \* \*

UNITED STATES PATENT AND TRADEMARK OFFICE
CERTIFICATE OF CORRECTION

PATENT NO. : 10,748,175 B2
APPLICATION NO. : 16/542562
DATED : August 18, 2020
INVENTOR(S) : Anthony Vierra Page 1 of 1

It is certified that error appears in the above-identified patent and that said Letters Patent is hereby corrected as shown below:

In the Claims

Column 27, Line 16, Claim 9, "(i)" should read --(ii)--.

Signed and Sealed this
Tenth Day of November, 2020

Andrei Iancu
*Director of the United States Patent and Trademark Office*